United States Patent
Arcand et al.

(10) Patent No.: US 12,530,618 B2
(45) Date of Patent: Jan. 20, 2026

(54) SYSTEM AND METHOD FOR OPERATING AN EVENT-DRIVEN ARCHITECTURE

(71) Applicant: ServiceNow, Inc., Santa Clara, CA (US)

(72) Inventors: Jean-François Arcand, Montreal (CA); Gabriel Duford, Montreal (CA); Marc Boissonneault, Montreal (CA); Andre Milton, Montreal (CA); Christian Hudon, Montreal (CA)

(73) Assignee: ServiceNow, Inc., Santa Clara, CA (US)

( * ) Notice: Subject to any disclaimer, the term of this patent is extended or adjusted under 35 U.S.C. 154(b) by 937 days.

(21) Appl. No.: 17/773,093

(22) PCT Filed: Oct. 30, 2020

(86) PCT No.: PCT/IB2020/060243
§ 371 (c)(1),
(2) Date: Apr. 29, 2022

(87) PCT Pub. No.: WO2021/084512
PCT Pub. Date: May 6, 2021

(65) Prior Publication Data
US 2022/0374301 A1    Nov. 24, 2022

Related U.S. Application Data

(60) Provisional application No. 62/928,325, filed on Oct. 30, 2019, provisional application No. 62/928,322, (Continued)

(51) Int. Cl.
*G06N 3/091* (2023.01)
*G06F 9/451* (2018.01)
(Continued)

(52) U.S. Cl.
CPC ............. *G06N 20/00* (2019.01); *G06F 9/451* (2018.02); *G06F 9/542* (2013.01);
(Continued)

(58) Field of Classification Search
CPC ........ G06N 3/091; G06N 5/043; G06N 20/00; G06F 9/451; G06F 9/542; G06F 18/217;
(Continued)

(56) References Cited

U.S. PATENT DOCUMENTS 6,148,322 A     11/2000   Sand et al.
6,427,142 B1 *  7/2002    Zachary .................... G06F 8/34
                                                       706/45
(Continued)

FOREIGN PATENT DOCUMENTS

CA     2432984 C  *  8/2008  ............. G06N 5/043
CA     2788836 A1 *  9/2011  ............. H04W 4/02
(Continued)

OTHER PUBLICATIONS

Ali Dorri, etc., "Multi-Agent Systems- A Survey", published to IEEE Access, vol. 4, 2016, retrieved Jun. 30, 2025. (Year: 2016).*
(Continued)

*Primary Examiner* — Shourjo Dasgupta
(74) *Attorney, Agent, or Firm* — FLETCHER YODER PC

(57) ABSTRACT

There is disclosed a method and system for operating an event-driven architecture. The event-driven architecture comprises a first machine-learning (ML) agent operating a first service and a second ML agent operating a second service. The first ML agent comprises a first model and first model metadata. The second ML agent comprises a second model and second model metadata. The method comprises generating, by the first ML agent, an event associated with event metadata. The event comprises results generated by the first model. The event metadata comprises an event
(Continued)

identifier (ID). The first ML agent publishes the event in a virtualized dedicated space. The second ML agent determines whether the event is to be processed by the second ML agent. If a determination is made that the message is to be processed by the second ML agent, the second ML agent processes the event to generate an output.

17 Claims, 36 Drawing Sheets

Related U.S. Application Data filed on Oct. 30, 2019, provisional application No. 62/928,331, filed on Oct. 30, 2019, provisional application No. 62/928,323, filed on Oct. 30, 2019.

(51) Int. Cl.
| | |
|---|---|
| G06F 9/54 | (2006.01) |
| G06F 11/07 | (2006.01) |
| G06F 11/30 | (2006.01) |
| G06F 11/32 | (2006.01) |
| G06F 18/21 | (2023.01) |
| G06N 5/043 | (2023.01) |
| G06N 20/00 | (2019.01) |

(52) U.S. Cl.
CPC ........ *G06F 11/0745* (2013.01); *G06F 11/302* (2013.01); *G06F 11/323* (2013.01); *G06F 18/217* (2023.01); *G06N 3/091* (2023.01); *G06N 5/043* (2013.01)

(58) Field of Classification Search
CPC ... G06F 11/302; G06F 11/323; G06F 11/0745
See application file for complete search history.

(56) References Cited

U.S. PATENT DOCUMENTS

| | | | |
|---|---|---|---|
| 6,751,657 B1 | 6/2004 | Zothner | |
| 7,036,128 B1* | 4/2006 | Julia | G06N 5/043 707/E17.139 |
| 8,463,244 B2* | 6/2013 | Kim | H04M 1/72427 455/550.1 |
| 10,521,284 B2 | 12/2019 | Mcclory et al. | |
| 10,721,260 B1 | 7/2020 | Schlarp et al. | |
| 2002/0107826 A1* | 8/2002 | Ramachandran | G06N 5/043 706/49 |
| 2004/0015366 A1 | 1/2004 | Wiseman et al. | |
| 2016/0034267 A1 | 2/2016 | Wetzold et al. | |
| 2016/0034322 A1 | 2/2016 | Braudes et al. | |
| 2016/0127254 A1 | 5/2016 | Kumar et al. | |
| 2016/0180240 A1* | 6/2016 | Majumdar | G06N 3/006 706/46 |
| 2017/0192825 A1 | 7/2017 | Biberman et al. | |
| 2017/0192952 A1 | 7/2017 | Lehmann et al. | |
| 2018/0081743 A1 | 3/2018 | Mowatt et al. | |
| 2018/0084021 A1 | 3/2018 | Rubin et al. | |
| 2018/0089592 A1 | 3/2018 | Zeiler et al. | |
| 2018/0137094 A1 | 5/2018 | Zhou et al. | |
| 2018/0293462 A1 | 10/2018 | Ambati et al. | |
| 2019/0102411 A1 | 4/2019 | Hung et al. | |
| 2019/0102695 A1 | 4/2019 | Biswas et al. | |
| 2019/0108418 A1 | 4/2019 | Coven et al. | |
| 2019/0132203 A1 | 5/2019 | Wince et al. | |
| 2019/0304157 A1 | 10/2019 | Amer et al. | |
| 2020/0090654 A1 | 3/2020 | Shin et al. | |
| 2022/0366403 A1 | 11/2022 | Yao | |

FOREIGN PATENT DOCUMENTS

| | | |
|---|---|---|
| CN | 201022200 Y * | 2/2008 |
| JP | H09160849 A * | 6/1997 |

OTHER PUBLICATIONS

Qiuyan Zhong, etc., "Research on Multi-Agent Coordination in Emergency Decision-Making", published via 2010 International Conference on E-Product E-Service and E-Entertainment, held Nov. 7-Nov. 9, 2010, retrieved Jul. 2, 2025. (Year: 2010).*
Notice of Allowance with regard to the counterpart U.S. Appl. No. 17/773,097 mailed Dec. 6, 2023.
Mounce et al., "Development and Verification of an Online Artificial Intelligence System for Detection of Bursts and Other Abnormal Flows", J. Water Resour. Plann. Manage., 2010, 136(3), 11 pages.
European Search Report with regard to the counterpart EP Patent Application No. 20882227.0 completed Oct. 30, 2023.
European Search Report with regard to the counterpart EP Patent Application No. 20881468.1 completed Sep. 22, 2023.
Office Action with regard to the counterpart U.S. Appl. No. 17/773,097 mailed Jul. 7, 2023.
Peter R. Pietzuch, "Hermes: A scalable event-based middleware", University of Cambridge, No. 590, Jun. 2004, 180 pages.
International Search Report and Written Opinion with regard to the International Patent Application No. PCT/IB2020/060239 mailed Jan. 15, 2021.
Arcand et al., "Cognition Based Multi-Agent Architecture", ATAL 1995, 16 pages.
International Search Report and Written Opinion with regard to the International Patent Application No. PCT/IB2020/060238 mailed Feb. 4, 2021.
Ishakian et al., "Serving deep learning models in a serverless platform", IEEE International Conference on Cloud Engineering, 2018, pp. 257-262.
Feng et al., "Exploring Serverless Computing for Neural Network Training", IEEE 11th International Conference on Cloud Computing, 2018, pp. 334-341.
International Search Report and Written Opinion with regard to the International Patent Application No. PCT/IB2020/060243 mailed Feb. 5, 2021.
Balaji et al., "An introduction to multi-agent systems", Innovations in multi-agent systems and applications. Springer, Berlin, Heidelberg, 2010, pp. 1-27.
Nii, "The Blackboard Model of Problem Solving and the Evolution of Blackboard Architectures", AI Magazine vol. 7 No. 2, 1986, pp. 38-53.
Elofson et al., "A blackboard architecture for learning", Expert Systems With Applications, vol. 7, 1994, pp. 67-83.
Qiang et al., "The Implement of Blackboard-based Multi-agent Intelligent Decision Support System", 2010 Second International Conference on Computer Engineering and Applications, IEEE, pp. 572-575.

* cited by examiner

1700

SYSTEM AND METHOD FOR OPERATING AN EVENT-DRIVEN ARCHITECTURE

CROSS-REFERENCE TO RELATED APPLICATIONS

This application claims the benefit of and priority to U.S. Provisional Patent Application No. 62/928,322, filed Oct. 30, 2019, U.S. Provisional Patent Application No. 62/928,331, filed Oct. 30, 2019, U.S. Provisional Patent Application No. 62/928,323, filed Oct. 30, 2019, and U.S. Provisional Patent Application No. 62/928,325, filed Oct. 30, 2019, each of which is incorporated by reference herein in their entirety.

FIELD

The present technology relates to systems and methods for operating an event-driven architecture.

BACKGROUND

Machine learning (ML) algorithms can be useful for processing events in an event-driven architecture. The ML algorithms can be configured to make predictions and/or perform other operations. It may be difficult to integrate these ML algorithms in an existing operating environment. It may be difficult to configure the ML algorithms.

There is therefore a need for methods and systems for allowing a user to deploy and/or configure various ML algorithms.

SUMMARY

The present technology is directed to systems and methods for operating an event-driven architecture.

In one broad aspect, there is provided a method for operating an event-driven architecture, the event-driven architecture comprising a first machine-learning (ML) agent operating a first service and a second ML agent operating a second service, the first ML agent comprising a first model and first model metadata, the second ML agent comprising a second model and second model metadata, the method comprising: generating, by the first ML agent, an event associated with event metadata, the event comprising results generated by the first model, the event metadata comprising an event identifier (ID); publishing, by the first ML agent, in a virtualized dedicated space, the event; and causing the second ML agent to monitor the virtualized dedicated space and to determine whether the event is to be processed by the second ML agent, if determination is made that the message is to be processed by the second ML agent: processing the event to generate an output, the processing comprising one of further training the second model based on the event or generating a prediction by the second model based on the event.

In some implementations of the method, the method further comprises generating a response based on the output, the response comprising the event ID; and publishing the response, by the second ML agent, in the virtualized dedicated space.

In some implementations of the method, the method further comprises causing the first ML agent to monitor the virtualized dedicated space and to determine whether the response is to be processed by the first ML agent based on the event ID, if determination is made that the response is to be consumed by the first ML agent, processing the response.

In some implementations of the method, determining whether the event is to be processed by the second ML agent is based on a predefined workflow defining a sequence of actions between the first AI agent and the second AI agent.

In some implementations of the method, the second AI agent is one of an inference agent configured to generate a prediction by the second model based on the event, a learning agent configured to execute further training the second model based on the event or an inference/learning agent configured to generate a prediction by the second model based on the event and execute further training the second model based on the event.

In some implementations of the method, the event is a plurality of events, the plurality of events comprising a first set of events associated with a first feed and a second set of events associated with a second feed and wherein the first ML agent monitors the first feed and the second ML agent monitors the second feed.

In some implementations of the method, the virtualized dedicated space is a first virtualized dedicated space and wherein the event comprises intermediate results, the method further comprising, if a level of confidence relating to the intermediate results is lower than a certain threshold, publishing the intermediate results in the second virtualized dedicated space.

In some implementations of the method, the event is associated with a ML model and comprises at least a partial representation of the ML model and wherein the metadata is associated with the ML model.

In some implementations of the method, the event associated with the ML model and the metadata associated with the ML model is published in a third virtualized dedicated space (models cloud space).

In some implementations of the method, the first ML agent comprises one or more services mesh which encapsulates state and behavior.

In some implementations of the method, the first ML agent is configured to provide behavioral insights and operational control over a mesh.

In some implementations of the method, the first ML agent and the second ML agent enable one of a network of deployed services with load balancing, service-to-service authentication and monitoring.

In some implementations of the method, the second ML agent is further configured to execute at least one of caching the event for later usage, augmenting the event or pushing the event back to the first virtualized dedicated space.

In some implementations of the method, publishing the event in the virtualized dedicated space comprises broadcasting a signal comprising the event.

In some implementations of the method, the method further comprises enabling a formal representation of knowledge based on a system type information for the event broadcasted within the signal.

In another broad aspect, there is provided a system comprising: at least one processor, and memory storing a plurality of executable instructions which, when executed by the at least one processor, cause the system to: generate, by a first machine-learning (ML) agent operating a first service, an event associated with event metadata, wherein the first ML agent comprises a first model and first model metadata, wherein the event comprises results generated by the first model, an wherein the event metadata comprises an event identifier (ID); publish by the first ML agent, the event in a virtualized dedicated space; cause a second ML agent to monitor the virtualized dedicated space and to determine whether the event is to be processed by the second ML agent, wherein the second ML agent comprises a second model and second model metadata; and if a determination is made that the message is to be processed by the second ML agent, process the event to generate an output, the processing comprising one of further training the second model based on the event or generating a prediction by the second model based on the event.

In some implementations of the system, the second AI agent is one of an inference agent configured to generate a prediction by the second model based on the event, a learning agent configured to execute further training the second model based on the event or an inference/learning agent configured to generate a prediction by the second model based on the event and execute further training the second model based on the event.

In some implementations of the system, the instructions further cause the system to: generate a response based on the output, the response comprising the event ID; and publish the response, by the second ML agent, in the virtualized dedicated space.

In other aspects, various implementations of the present technology provide a non-transitory computer-readable medium storing program instructions for executing one or more methods described herein, the program instructions being executable by a processor of a computer-based system.

In other aspects, various implementations of the present technology provide a computer-based system, such as, for example, but without being limitative, an electronic device comprising at least one processor and a memory storing program instructions for executing one or more methods described herein, the program instructions being executable by the at least one processor of the electronic device.

In the context of the present specification, unless expressly provided otherwise, a computer system may refer, but is not limited to, an "electronic device," a "computing device," an "operation system," a "system," a "computer-based system," a "computer system," a "network system," a "network device," a "controller unit," a "monitoring device," a "control device," a "server," and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (e.g., CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Additional and/or alternative features, aspects and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
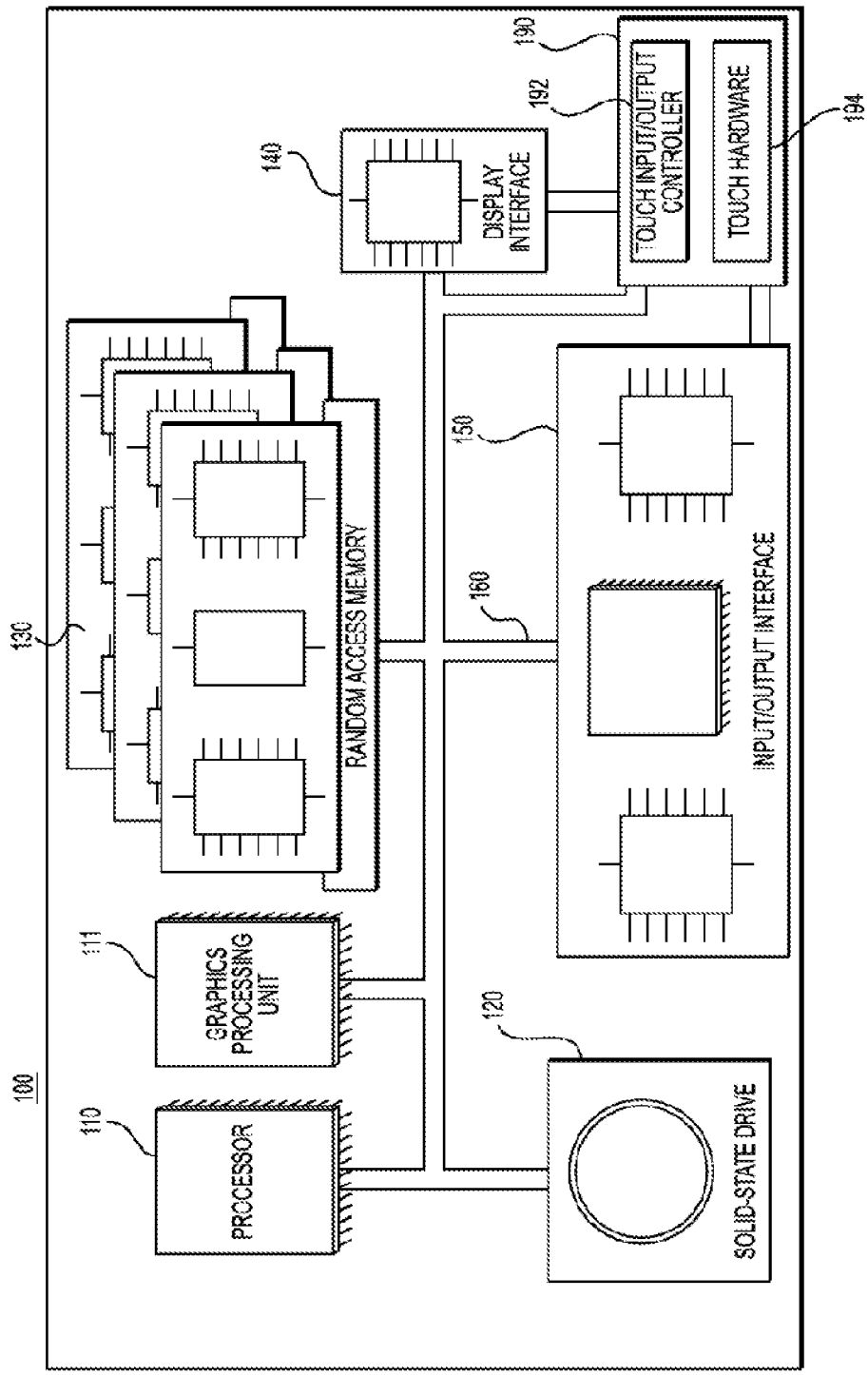
FIG. 1 is a block diagram of an example computing environment in accordance with embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that one or more modules may include for example, but without being limitative, computer program logic, computer program instructions, software, stack, firmware, hardware circuitry, or a combination thereof which provides the required capabilities.

With these fundamentals in place, we will now consider some non-limiting examples to illustrate various implementations of aspects of the present technology.

FIG. 1 illustrates a computing environment in accordance with an embodiment of the present technology, shown generally as 100. In some embodiments, the computing environment 100 may be implemented by any of a conventional personal computer, a computer dedicated to managing network resources, a network device and/or an electronic device (such as, but not limited to, a mobile device, a tablet device, a server, a controller unit, a control device, etc.), and/or any combination thereof appropriate to the relevant task at hand. In some embodiments, the computing environment 100 comprises various hardware components including one or more single or multi-core processors collectively represented by processor 110, a solid-state drive 120, a random access memory 130, and an input/output interface 150. The computing environment 100 may be a computer specifically designed to operate a machine learning algorithm (MLA). The computing environment 100 may be a generic computer system.

In some embodiments, the computing environment 100 may also be a subsystem of one of the above-listed systems. In some other embodiments, the computing environment 100 may be an "off-the-shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Those skilled in the art will appreciate that processor 110 is generally representative of a processing capability. In some embodiments, in place of one or more conventional Central Processing Units (CPUs), one or more specialized processing cores may be provided. For example, one or more Graphic Processing Units (GPUs), Tensor Processing Units (TPUs), and/or other so-called accelerated processors (or processing accelerators) may be provided in addition to or in place of one or more CPUs.

System memory will typically include random access memory 130, but is more generally intended to encompass any type of non-transitory system memory such as static random access memory (SRAM), dynamic random access memory (DRAM), synchronous DRAM (SDRAM), read-only memory (ROM), or a combination thereof. Solid-state drive 120 is shown as an example of a mass storage device, but more generally such mass storage may comprise any type of non-transitory storage device configured to store data, programs, and other information, and to make the data, programs, and other information accessible via a system bus 160. For example, mass storage may comprise one or more of a solid state drive, hard disk drive, a magnetic disk drive, and/or an optical disk drive.

Communication between the various components of the computing environment 100 may be enabled by a system bus 160 comprising one or more internal and/or external buses (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wired or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example the networking interface may implement specific physical layer and data link layer standards such as Ethernet, Fibre Channel, Wi-Fi, Token Ring or Serial communication protocols. The specific physical layer and the data link layer may provide a base for a full network protocol stack, allowing communication among small groups of computers on the same local area network (LAN) and large-scale network communications through routable protocols, such as Internet Protocol (IP).

According to some implementations of the present technology, the solid-state drive 120 stores program instructions suitable for being loaded into the random access memory 130 and executed by the processor 110 for executing acts of one or more methods described herein. For example, at least some of the program instructions may be part of a library or an application.

Aquarium OS

Figure 2:
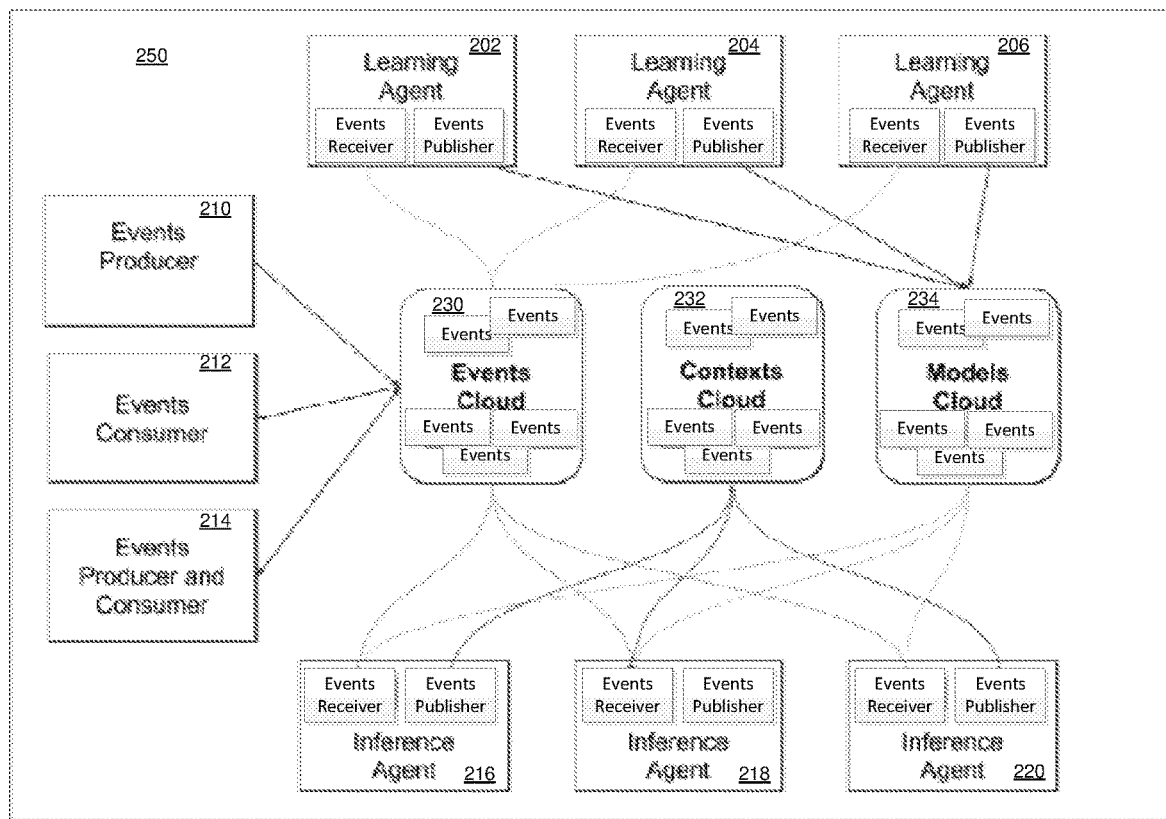
FIG. 2 is a schematic illustration of an operating environment in accordance with embodiments of the present technology.

FIG. 2 is a schematic illustration of an operating environment 200 which may be used to operate one or more software components, such as, for example artificial intelligence (AI) components 210-214. In some embodiments, the operating environment 200 is also referred to as an operation system (OS) that may support end-to-end needs of companies looking to create, deploy, monitor and/or continually improve enterprise AI solutions by bringing together tools for AI model building, AI governance and/or business process optimization. In some embodiments, the operating environment 200 allows empowering users with an explainable AI solution. The operating environment 200 also allows users to gain access to a library of AI capabilities and models to build scalable AI solutions catered to a given environment (e.g., an organization such as a company). In some embodiments, the operating environment 200 is based on a modular approach operating transfer learning to enable continuous model improvement. In some embodiments, the operating environment 200 enables operations and monitoring of a plurality of AI models at the same time.

The artificial intelligence modules 210-214 may be broadly defined as software component operating algorithm adaptable to a context in which they operate. In some embodiments, the AI components 210-214 may operate machine learning (ML) approaches relying on data ingested from an environment in which the AI components 210-214 operate. In some embodiments, the AI components 210-214 may comprise, for example but without being limitative, a machine-vision module, a natural language processing (NLP) module, an optical character recognition (OCR) module, a document classifier module. Other examples will become apparent to the person skilled in the art of the present technology. In some embodiments, the AI components 210-214 may comprise one or more models (i.e., algorithms previously trained and/or yet to be trained) and model metadata (i.e., data relating to the one or more models such as information about the data used to train the one or more models, version of the data used to train the one or more models, one or more problems the one or more models are designed to solve, a time stamp associated with last training, etc).

The operating environment 200 provides a framework for collaboration of one or more AI components so as to provide an information system which allows responsiveness, resiliency, elasticity and/or maintainability. In some embodiments, the operating environment 200 comprises a message-based architecture allowing communication between the AI agents 210-214. In some embodiments, communication between the AI agents 210-214 is based on messages. Further details on how messages may be implemented are detailed below.

In the embodiment illustrated at FIG. 2, the AI agent 210 may be categorized as an events producer module (equally referred to as a "producer" or "events producer"), the AI agent 212 is categorized as an events consumer module (equally referred to as a "consumer" or "events consumer") and the AI agent 214 is categorized as an events producer and consumer module 216 (equally referred to as a "producer and consumer" or "events producer and consumer"). It should be understood that the embodiment of FIG. 2 aims at exemplifying distinct roles that AI agents 214-216 may be associated with, irrespectively of a functionality that they implement (e.g., a NLP module may be an events consumer, an events producer or an events consumer and producer).

In some embodiments, the message-based architecture enables asynchronous communication between the AI agents 214-216 thereby allowing producers and consumers of messages to be de-coupled. As a result, producers and consumers may run on different machines, may run at different times, may run on different hardware and/or software platforms. Additional benefits of such message-based architecture include flexibility for coordination of multiple producers/consumers, for example, in the context of computing-intensive applications requiring multiple machines. Additional benefits also include flexibility, scalability, higher availability, higher stability when services are temporarily unavailable (e.g., in the context of processing orders, a message-based architecture allows avoiding "dropping" orders). Additional benefits also further include enablement of publish/subscribe, message filtering, routing, fan out and/or decoupling message rate and consumer availability.

More specifically, the message-based architecture of the operating environment 200 comprises an event-driven architecture. In some embodiments, the event-driven architecture is based on the hypothesis that data of the operating environment may not be current. The event-driven architecture is based on events and is configured so as to determine meaning of data and whether data is current or not. As a result, the operating environment 200 does not operate on the assumption that all data is current but, instead, that data may not reflect a current state but rather an event that occurred in the past.

The event-driven architecture of the operating environment 200 is configured so as to operate one or more messaging systems which feed the operating environment 200 with events. As events are generated, the one or more messaging systems may undertake to automatically index, transform and/or replicate the events. In some embodiments, the one or more messaging systems may enable real-time monitoring and/or decision making based on dashboards created from the events. In some embodiments, the events are generated in a format defining an application programming interface (API) common to all AI agents operated with the operating environment 200. In some embodiments, an event may be defined as a "change in state". An event may be shared between agents and non-agents components using topics and at least one events producer. In some embodiments, an agent is a user or an automated software application that can execute tasks. Events may be delivered using messages. In some embodiments, a format used to define an event may be based on the CloudEvents Specification which is a vendor-neutral specification for defining the format of event data.

In some embodiments, a message may comprise metadata and one or more events. A message may also be associated with a message topic so that messages may be published and delivered to subscribers of the message topic. In some embodiments, an events producer produces events and delivers them using messages, an events consumer consumes events received using messages. In some embodiments, an events producer and consumer may publish and receive events.

Still referring to FIG. 2, an events cloud (EC) 230, a contexts cloud (CC) 232 and a models cloud (MC) 234 are illustrated.

The EC 230 is a virtualized location within which events are published and made ready to be consumed. Events are published using one or more messages and delivered to one or more message consumers. Events published to an EC such as the EC 230 may take the form of a request for information between agents listening to a topic (equally referred to as "commands") and/or information that may be digested by agents. In some embodiments, a command does not necessarily require a response. In some embodiments, agents must reply to a command (request-response paradigm) but may reply to an event. As an example, a producer may ask for a document's entity. In that scenario, the event must contain the document, the metadata and an event ID. One or more agents may digest the event and use the event ID to produce a response, hence correlating the response with the request.

The CC 230 is a virtualized location wherein inference agents (such as inference agents 216-220) publish intermediate results or results where a level of confidence is lower than a certain threshold. Events published to the CC 230 may comprise a model response, metadata about the input data used to query the model and context information about a problem a model is designed to solve.

The MC 234 is virtualized location wherein events concerning models and their associated metadata are published. Events published to the MC 234 may comprise a partial or a full open neural network exchange (ONNX) representation of a model, metadata about what the model is designed to solve, a reference to the latest data used to train the model and a reference to the original model format.

Still referring to FIG. 2, inference agents 216-220 and learning agents 202-206 are also illustrated. In some embodiments, the inference agents 216-220 and the learning agents 202-206 may be broadly referred to as agents. In some embodiments, the agents may comprise one or more services mesh which encapsulates state and behavior. The agents may communicate by exchanging messages. The agents may be configured to provide behavioral insights and operational control over their respective mesh as a whole so as to offer to satisfy requirements of micro-service applications. The agents allow creating a network of deployed services with load balancing, service-to-service authentication and monitoring. The agents rely on asynchronous message passing to establish boundaries between software components so as to ensure loose coupling, isolation and location transparency.

In accordance with some embodiments, reliability of message delivery within the operating environment 200 allows applications to be reliably executed on multiple processor cores in one machine (i.e., "scaling up") and/or distributed across a computer network ("scaling out"). In some embodiments, mechanism for communication may be the same whether sending to an agent on a same machine or to a remote agent located on another machine even though latency of delivery and/or reliability may be impacted. In some embodiments, a local sending of messages may entail that messages may circulate without restrictions on the underlying object which is sent whereas a remote sending may place limitations, for example, on the message size. In accordance with some embodiments, rules may be applied to message sent. As a first example, a rule "at-most-once delivery" may entail that for each message handed to the operating environment 200, each message may be delivered once or not at all, said otherwise, messages may be lost. In some embodiments, the first example avoids keeping state at the sending end or the transport mechanism. As a second example, a rule "at-least-once delivery" may entail that for each message handed to the operating environment 200, multiple attempts may be made to complete the delivery such that at least one succeeds, said otherwise, messages may be duplicated but not lost. In some embodiments, the second example requires to counter transport losses by keeping state at the sending end and/or having an acknowledgement mechanism at the receiving end. As a third example, a rule "exactly-once delivery" may entail that for each message handed to the operating environment 200 exactly one delivery is made to the recipient, said otherwise, the message can neither be lost nor duplicated. In some embodiments, the third example further requires state to be kept at the receiving end in order to filter out duplicate deliveries.

Figure 3:
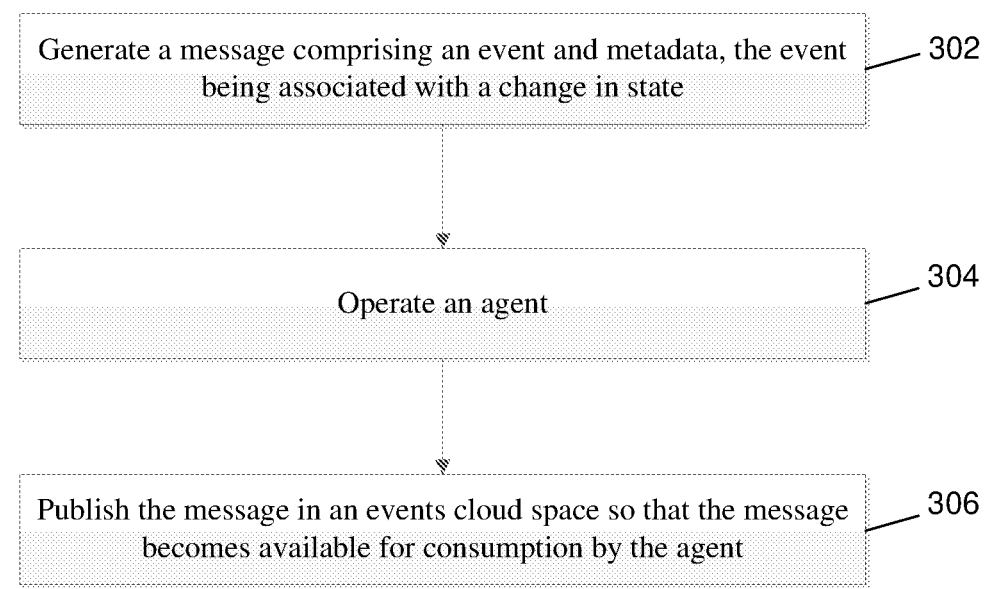
FIG. 3 is a schematic illustration of a computer-implemented method used in connection with operating an event-driven architecture in accordance with embodiments of the present technology.

Referring now to FIG. 3, some non-limiting example instances of systems and computer-implemented methods used in connection with operating an event-driven architecture are detailed. More specifically, FIG. 3 shows a flowchart illustrating a computer-implemented method 300 implementing embodiments of the present technology. The computer-implemented method of FIG. 3 may comprise a computer-implemented method executable by a processor of a computing environment, such as the computing environment 100 of FIG. 1, the method comprising a series of steps to be carried out by the computing environment.

Certain aspects of FIG. 3 may have been previously described with references to FIG. 2. The reader is directed to that disclosure for additional details.

The method 300 starts at step 302 by generating a message comprising an event and metadata, the event being associated with a change in state. Then, at step 304, the method 300 proceeds to operating an agent. Then, at step 306, the method 300 proceeds to publishing the message in an events cloud space so that the message becomes available for consumption by the agent. In some embodiments, the agent is one of an inference agent and a learning agent. In some embodiments, the agent is an inference agent generating intermediate results and if a level of confidence relating to the intermediate results is lower than a certain threshold, publishing the intermediate results in a contexts cloud space. In some embodiments, the event is associated with a model and comprises at least a partial representation of the model and wherein the metadata is associated with the model.

In some embodiments, the message comprises the event associated with the model and the metadata associated with the model is published in a models cloud space. In some embodiments, the agent comprises one or more services mesh which encapsulates state and behavior. In some embodiments, the agent is configured to provide behavioral insights and operational control over a mesh. In some embodiments, the agent is a plurality of agents and the plurality of agents creates a network of deployed services. In some embodiments, the agent comprises a decision algorithm implementing logic causing to determine whether events are to be processed by the agent. In some embodiments, the agent is a learning agent and operates logic to listen to events and decide to digest and/or learn from the events based on the determination made by the decision algorithm.

In some embodiments, publishing the message in the events cloud space comprises broadcasting a signal comprising the message. In some embodiments, the signal defines a stream on which other agents may tune themselves so as to consume the stream. In some embodiments, the method 300 further comprises enabling a formal representation of knowledge, the formal representation of knowledge being referred to as ontology. In some embodiments, the ontology is based on a system type description for the event broadcasted within the signal.

Figure 4:
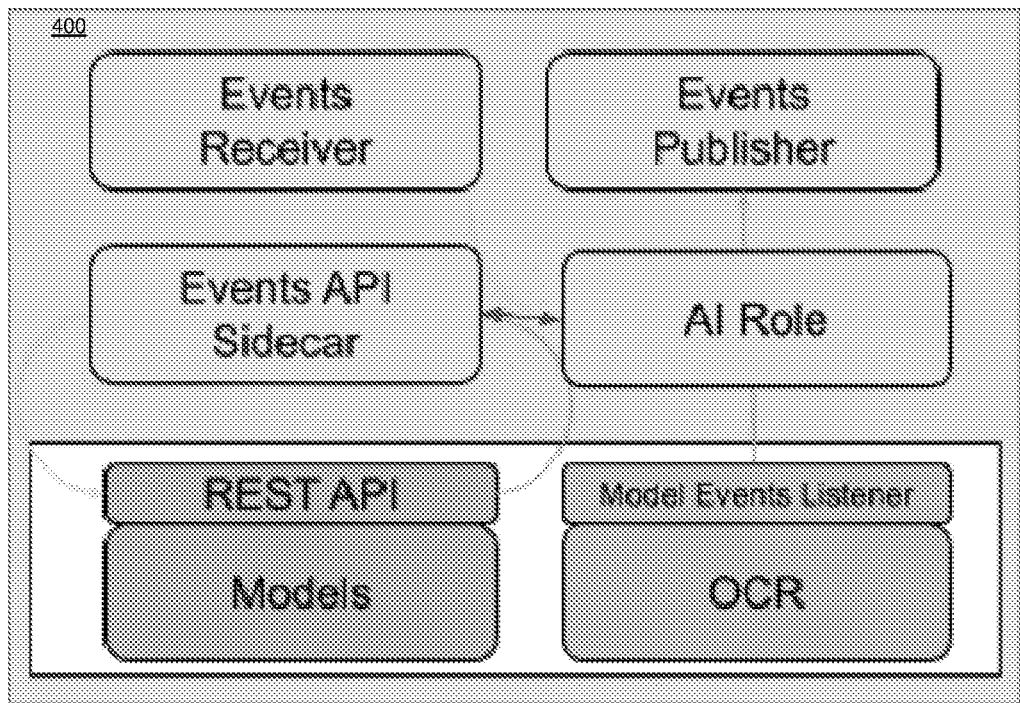
FIG. 4-6 illustrate exemplary embodiments of architectures enabling agents in accordance with embodiments of the present technology.
Figure 5:
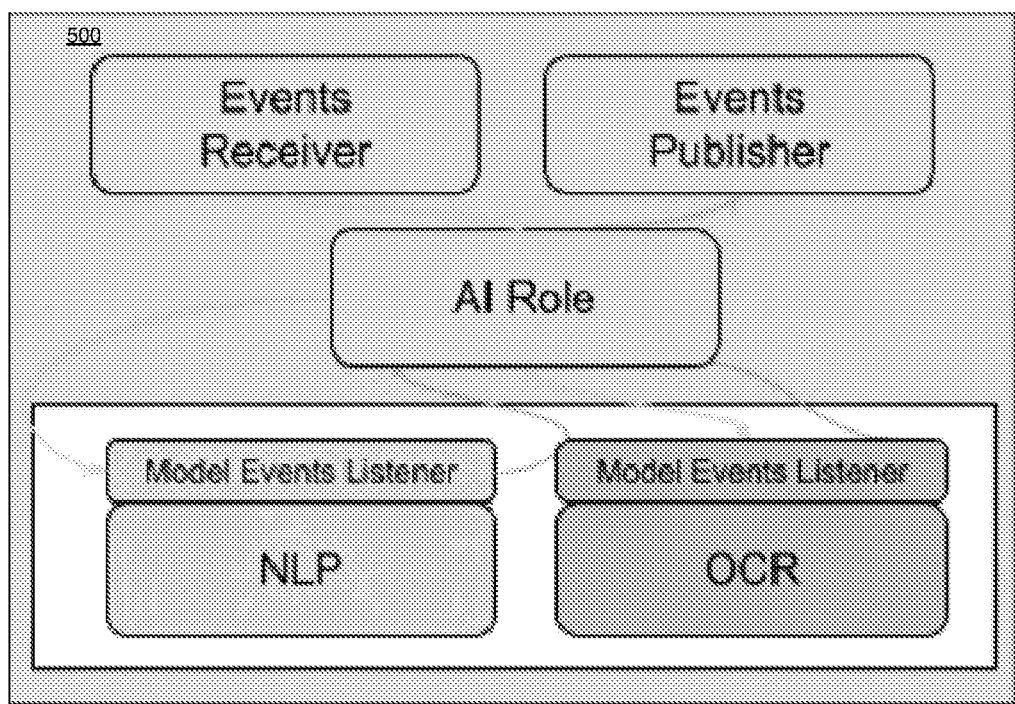
Figure 6:
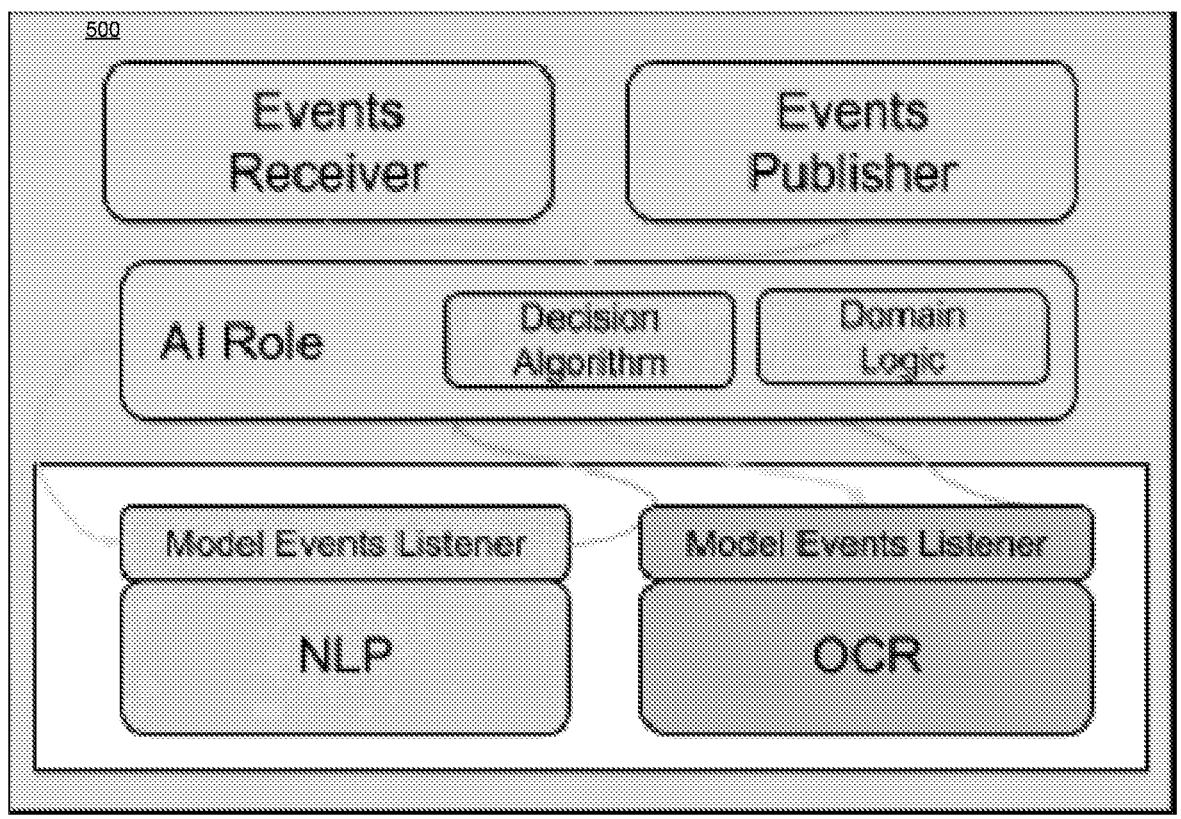

Turning now to FIGS. 4 and 5, exemplary embodiments of architectures enabling agents are disclosed. The architecture 400 comprises an events receiver, an events publisher, an events API sidecar, an AI role, models associated with REST API and an OCR module associated with a model events listener. In some embodiments, the events API sidecar is configured so as allow integration of components (e.g., agents) that are not yet event-driven. In some embodiments, the REST API enables representational state transfer (REST) software architecture. The architecture 500 comprises an events receiver, an events publisher, an AI role, an OCR module associated with a model events listener and an NLP module associated with a model events listener. An exemplary embodiment of the AI role is depicted at FIG. 6 in which the AI role comprises a decision algorithm and domain logic component (DLC). The decision algorithm may implement logic causing to determine whether events are to be processed by the agent. In some embodiments, the decision algorithm may implement an AI model and/or set of rules. When the decision algorithm determines that an event is to be processed, the event is delivered to one or more models associated with the agent. The event is then used to train the model and/or for querying the model. In some embodiments, the DLC comprises application's specific domain implementation.

As previously explained, agents may refer to learning agents (e.g., learning agents 202-206) or inference agents (e.g., inference agents 216-220). In some embodiments, the agents may also be implemented as non-AI agents.

In accordance with some embodiments, the learning agents 202-206 may listen to events published to the EC 230. The learning agents 202-206 may subscribe to one or more events topic. In some embodiments, events topic may equally be referred to as signals. In some embodiments, the signals may also be referred to as feeds. In some embodiments, signals may refer to a stream of certain types of events. As an example, a signal associated with the streaming of images may be referred to as an "image signal". Agents, such as the learning agents 202-206, may tune themselves to one or more signals and consume a stream of information transmitted within the one or more signals. Each agent may decide to execute certain actions based on the stream of information (e.g., applying pattern recognition to a stream of images, etc.). In some embodiments, each agent may augment the existing signal and/or emit a new signal. As the person skilled in the art of the present technology may appreciate, the broadcasting of multiple signals may provide an extensible, flexible, yet low maintenance and future-compatible architecture.

The learning agents 202-206 may operate logic to listen to events and decide to digest and/or learn from the events based on the determination made by the decision algorithm. In some embodiments, when the decision algorithm recognizes an event, it may learn from the event (e.g., train the model), cache the event for later usage, augment the event and push it back to the EC 230 and/or train the model and publish the new model back to the MC 234. In some embodiments, the learning agents 202-206 may be deemed to define a federation of learning agents establishing new concepts learned and/or new roles in the system.

In accordance with some embodiments, the inference agents 216-220 may listen to events published to the EC 230. The inference agents 216-220 may also upgrade models based on events received from the MC 234. The inference agents 216-220 may listen to events and decide to digest and react from the events based on the decision algorithm. In some embodiments, when the decision algorithm recognizes an event, it may react and inference a domain driven solution if the event is from the EC 230, cache the event for later usage and/or update the inference model if the event is from the MC 234.

Figure 7:
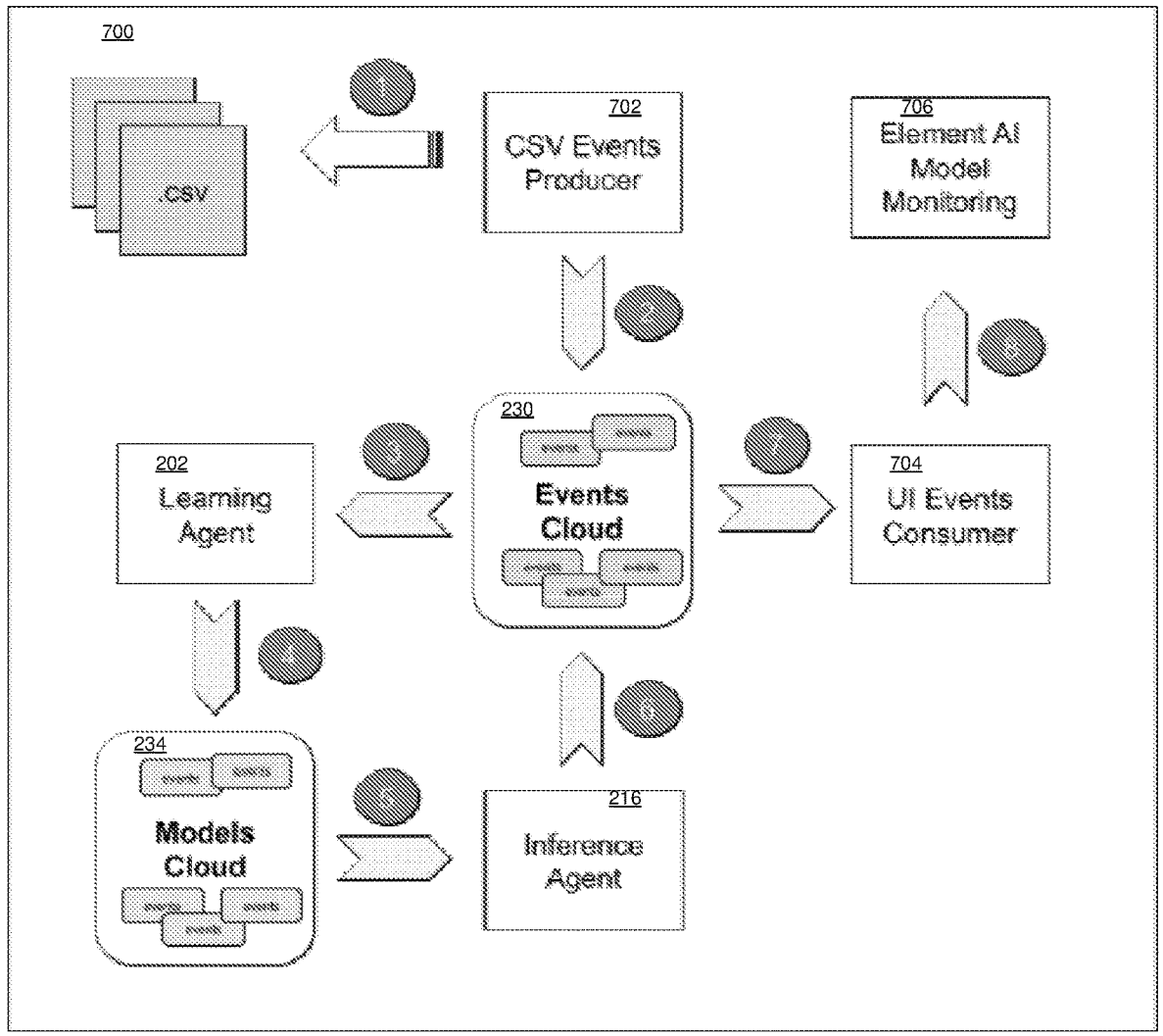
FIG. 7 illustrates a first exemplary scenario illustrating training of a model in the context of the operating environment in accordance with embodiments of the present technology.

Turning now to FIG. 7, a first exemplary scenario 700 illustrating training of a model in the context of the operating environment 200 is depicted. At step 1, a CVS events producers reads ".cvs" files. At step 2, the CVS events producer publishes the ".cvs" files into topic A. At step 3, the EC 230 delivers the ".cvs" files to subscribers of topic A. The learning agent 202 receives the ".cvs" files and train its associated model using the data. At step 4, the learning agent publishes its updated model into topic B. At step 5, the MC 234 delivers the updated model to subscribers of topic B. The inference agent 216 updates its model. Then, at step 6, the inference agent 216 then publishes an update message to topic C. At step 7, the EC 230 delivers the update message to subscribers of topic C. At step 8, UI events consumer 704 receives the updated message and push it back to a model monitoring module 706 (also referred to as an "Element AI Model Monitoring" module in the illustrated example).

Figure 8:
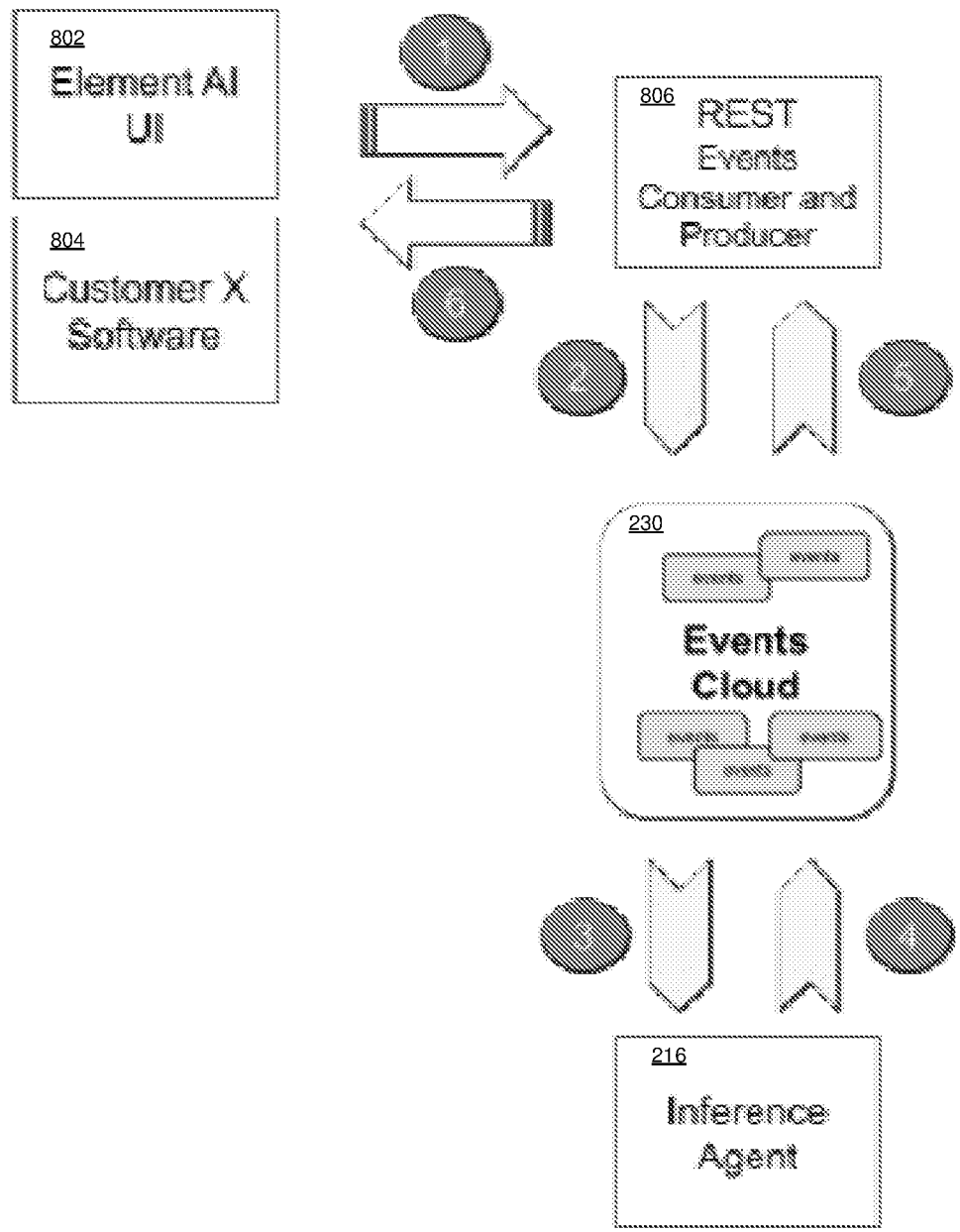
FIG. 8 illustrates a second exemplary scenario illustrating querying of a model in the context of the operating environment in accordance with embodiments of the present technology.

Turning now to FIG. 8, a second exemplary scenario 800 illustrating querying of a model in the context of the operating environment 200 is depicted. At step 1, a web application 802 (i.e, the module "Element AI UI" in this example) request, via REST, some inference data. At step 2, a REST events consumer and producer module 806 publishes a request event into topic A. At step 3, the EC 230 delivers the request event to subscribers of topic A. The inference agent 216 receives the request and processes it. At step 4, the inference agent 216 publishes its response into topic B. At step 5, the EC 230 delivers the response to subscribers of topic B. At step 6, the REST events consumer and producer module 806 write the response back to the web application 802.

Figure 9:
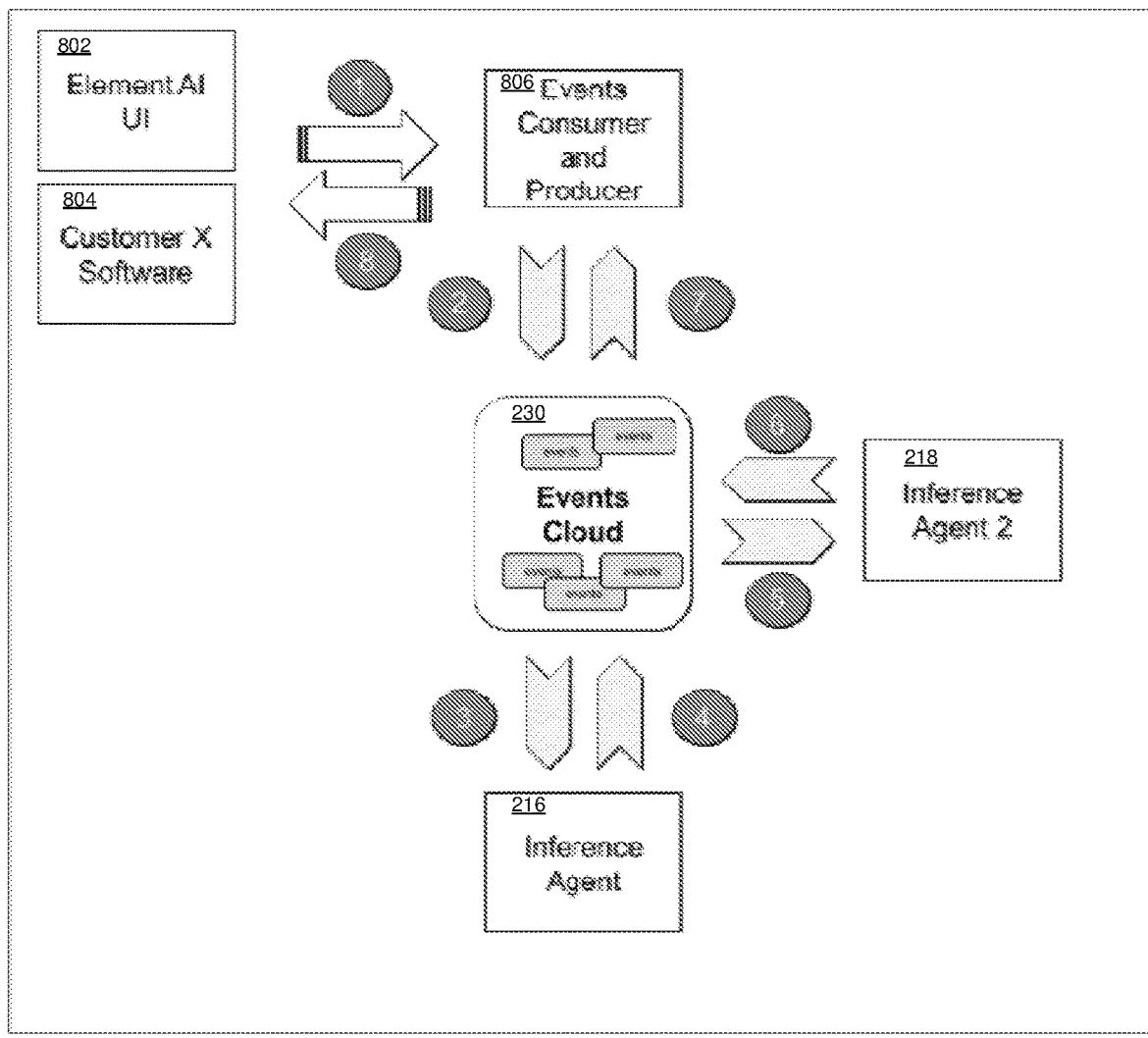
FIG. 9 illustrates a third exemplary scenario illustrating chaining of models in the context of the operating environment in accordance with embodiments of the present technology.

Turning now to FIG. 9, a third exemplary scenario 900 illustrating chaining of models in the context of the operating environment 200 is depicted. At step 1, the web application 802 requests, via REST, some inference data. At step 2, the REST events consumer and producer module 806 publishes the request event into topic A. At step 3, the EC 230 delivers the request event to subscribers of topic A. The inference agent 216 then receives the request and processes it. At step 4, the inference agent publishes its response into topic B. At step 5, the EC 230 delivers the request event to subscribers of topic B. Then, the inference agent 218 receives the request and processes it. At step 6, the inference agent 218 publishes its response into topic C. At step 7, the EC 230 delivers the response to subscribers of topic C. At step 8, the REST events consumer and producer module 806 writes the response back to the web application 802.

Figure 10:
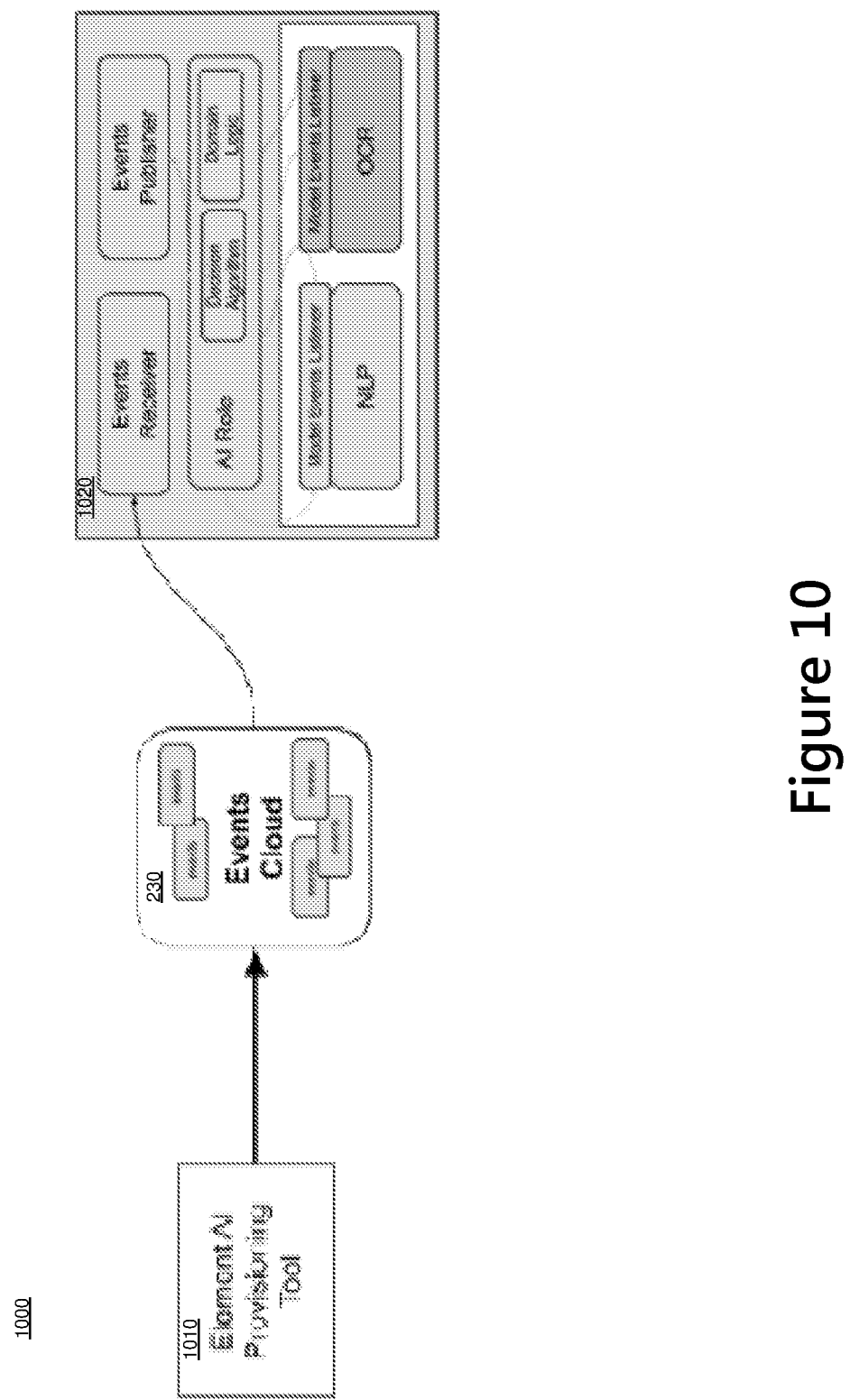
FIG. 10 illustrates a fourth exemplary scenario executing provisioning in the context of the operating environment in accordance with embodiments of the present technology.
Figure 11:
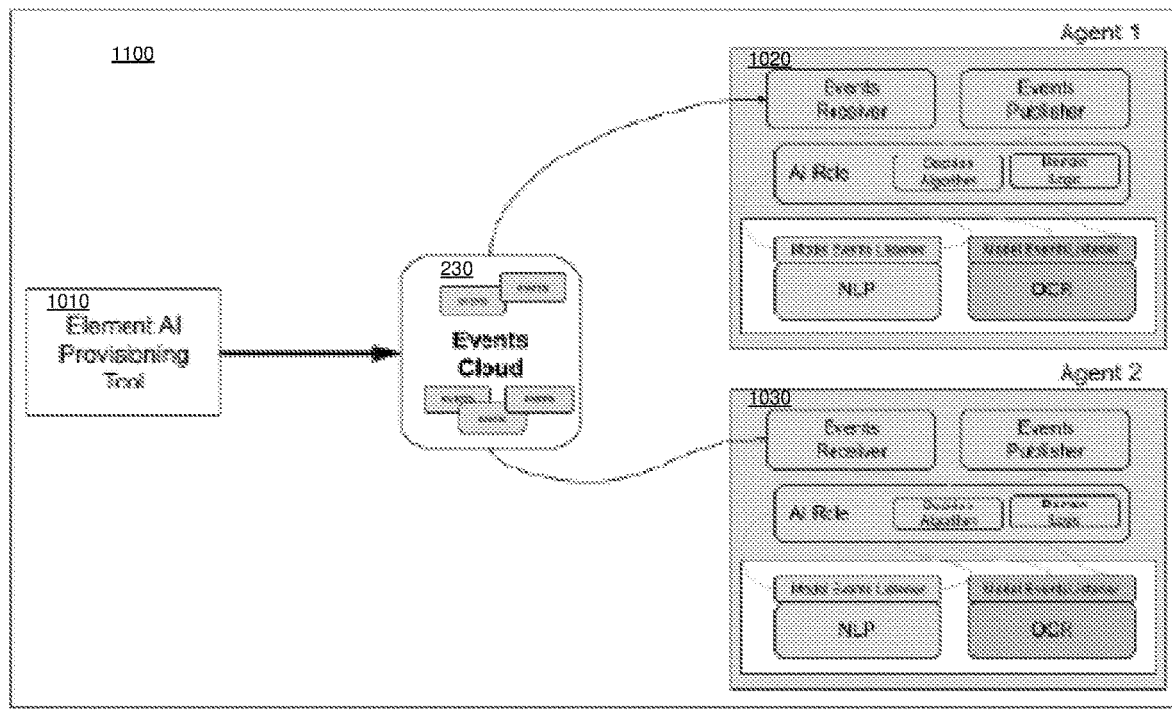
FIGS. 11 and 12 illustrate a fifth exemplary scenario and a sixth exemplary scenario in accordance with embodiments of the present technology.
Figure 12:
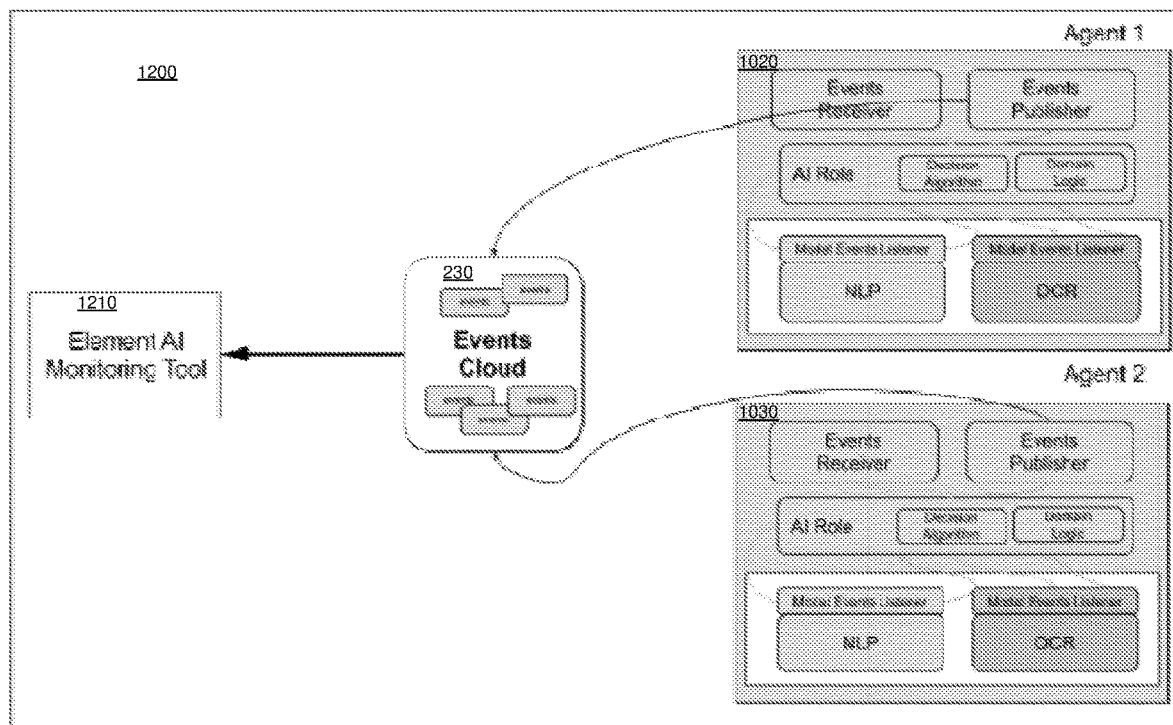

FIG. 10 illustrates a fourth exemplary scenario 1000 executing provisioning in the context of the operating environment 200. A provisioning tool 1010 (also referred to as "Element AI Provisional Tool" module in the illustrated example) cooperates with the EC 230 feeding messages to an agent 1020. FIG. 11 illustrates a fifth exemplary scenario 1100 executing provisioning in the context of the operating environment 200. In this embodiment, the provisioning tool 1010 collaborates with the agent 1020 and another agent 1030. FIG. 12 illustrates a sixth exemplary scenario 1200 executing monitoring in the context of the operating environment 200. In this embodiment, the EC 230 is relied upon to gather messages from the agents 1020 and 1030 and, in turn, feeds a monitoring module 1210 (also referred to as "Element AI Monitoring Tool" module in the illustrated example).

FIG. 11 and FIG. 12 illustrate a fifth exemplary scenario 1100 and a sixth exemplary scenario 1200.

Application Framework+Process Orchestrator+Workflow Optimizer

Figure 13:
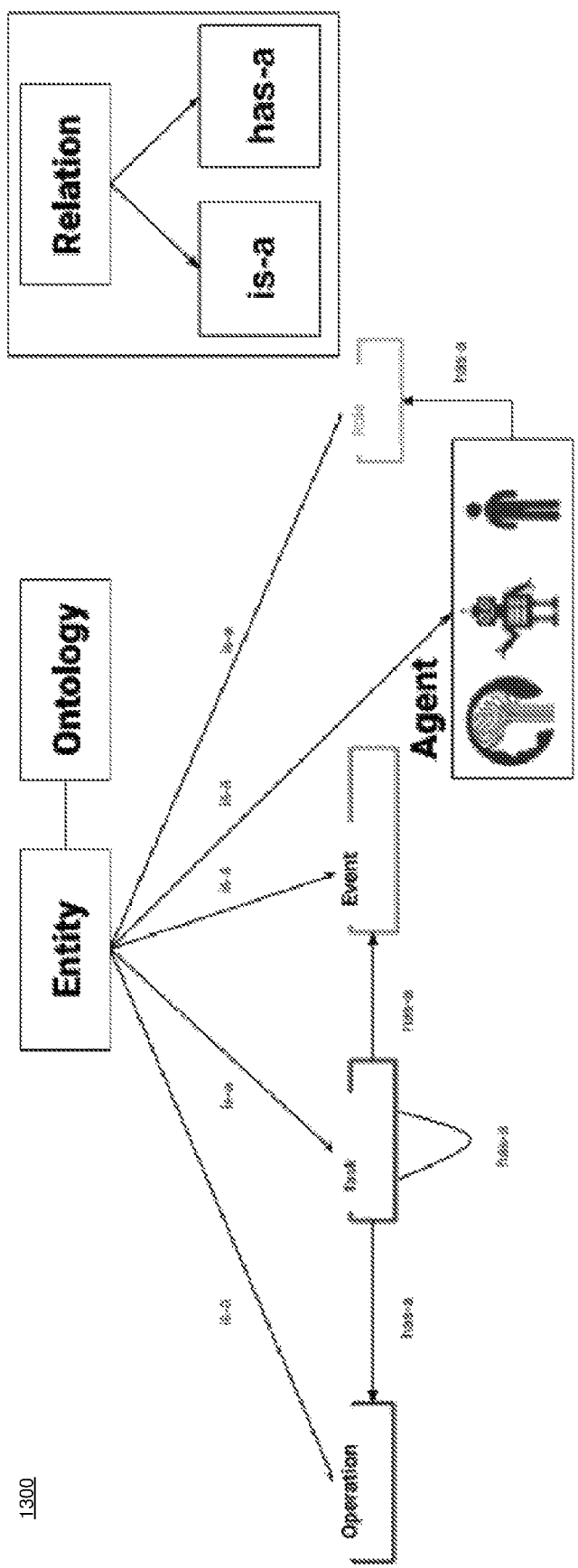
FIG. 13 illustrates an exemplary embodiment of an application framework in accordance with embodiments of the present technology.

Turning now to FIG. 13, an exemplary embodiment of an application framework 1300 enabling an operating environment (e.g., the operating environment 200) is depicted. In some embodiments, the application framework 1300 enables operation of software components (such as the AI modules 210-214) based on operation containers executed by one or more operation executors. The application framework 1300 enables a formal representation of knowledge, also referred to as "ontology", based on a set of concepts within a given domain along with relationships between those concepts.

Figure 14:
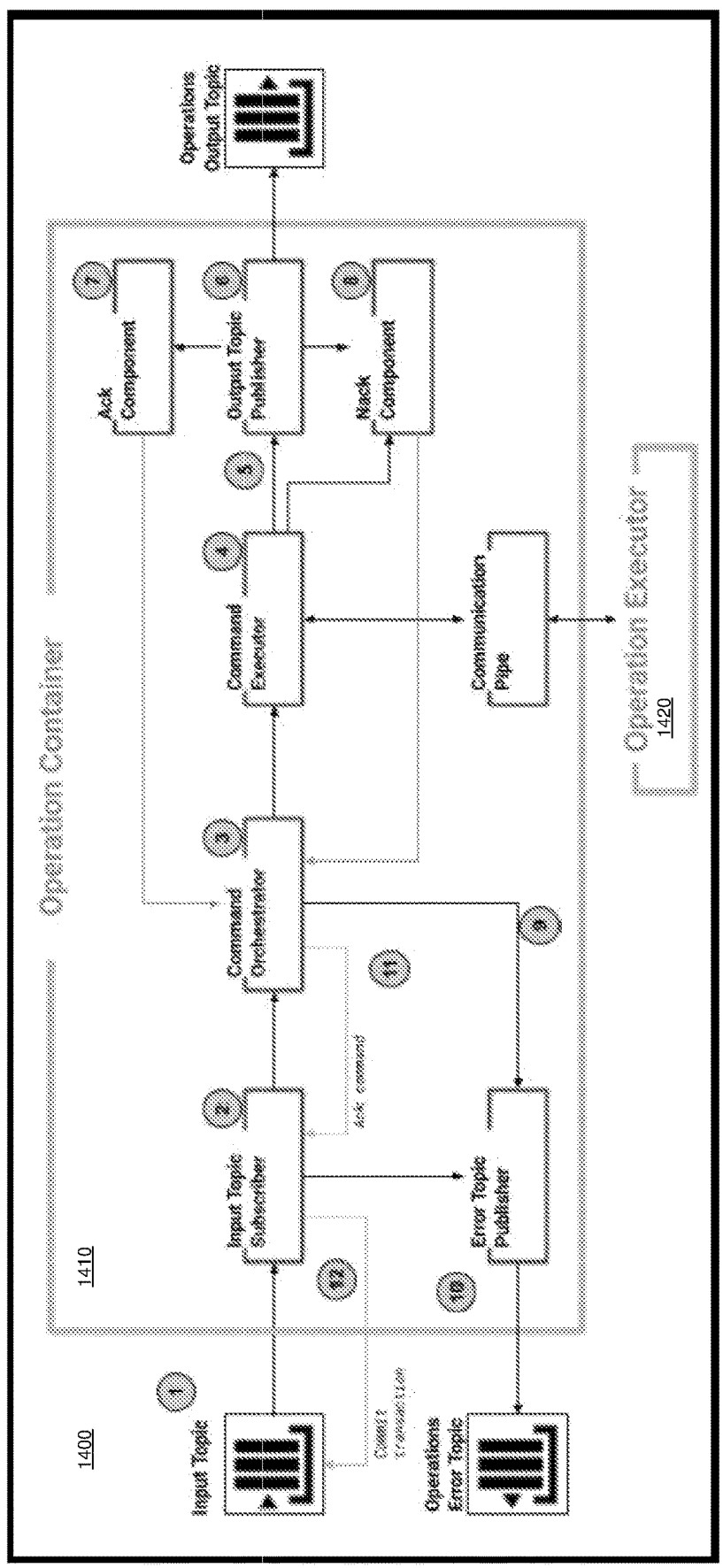
FIG. 14 illustrates an exemplary embodiment of an operation container and an operation executor in accordance with embodiments of the present technology.

Turning now to FIG. 14, an exemplary embodiment of an operation container 1410 and an operation executor 1420 is represented in the context of operating steps for processing events. At step 1, an event is published to an input topic. In this example, the event comprises an event context and associated data. In some embodiments, the event context and the data are read/appended only. At step 2, an input topic subscriber decodes the event and transforms it into a command. If the event cannot be decoded/parsed, an error topic publisher is invoked with new "error" event containing the original event that could not be decoded/parsed. At step 3, the command is passed to a command orchestrator. The command orchestrator may augment the command with contextual information. At step 4, the command executor receives the command and sends it through an operation container's communication pipe to the external operation executor which then executes the operation. The operation executor may either return a result object or void via the communication pipe. At step 5, if the operation is executed successfully, a new data object corresponding to the result may be created. Then, the event context and the data objects are passed to the output topic publisher. At step 6, the output topic publisher transforms the event context and the data objects into a new event which it publishes to the operations output topic. If successful, the output topic publisher may pass the event context object to an ack component. At step 7, the ack component may acknowledge the execution of the operation to the command orchestrator. At step 8, if the operation fails with a transient error, or if the operation fails with a permanent error, the original command and an error object are passed to a nack component. If the publishing to the operations output topic fails, the original command, an error object and the operation's result data are passed to the nack component. At step 9, when the command orchestrator cannot execute the command, the command orchestrator may invoke the error topic publisher (e.g., permanent operation error, operations output topic publishing error). At step 10, the error topic publisher publishes an error event containing the original event context, an error object and the result data object to the operations error topic. At step 11, whenever a new message is sent to any external topic (e.g., output-case 6, or error-case 10), the command orchestrator may acknowledge the processing of the command to the input topic subscriber. At step 12, the input topic subscriber may commit the transaction with the input topic.

Figure 15:
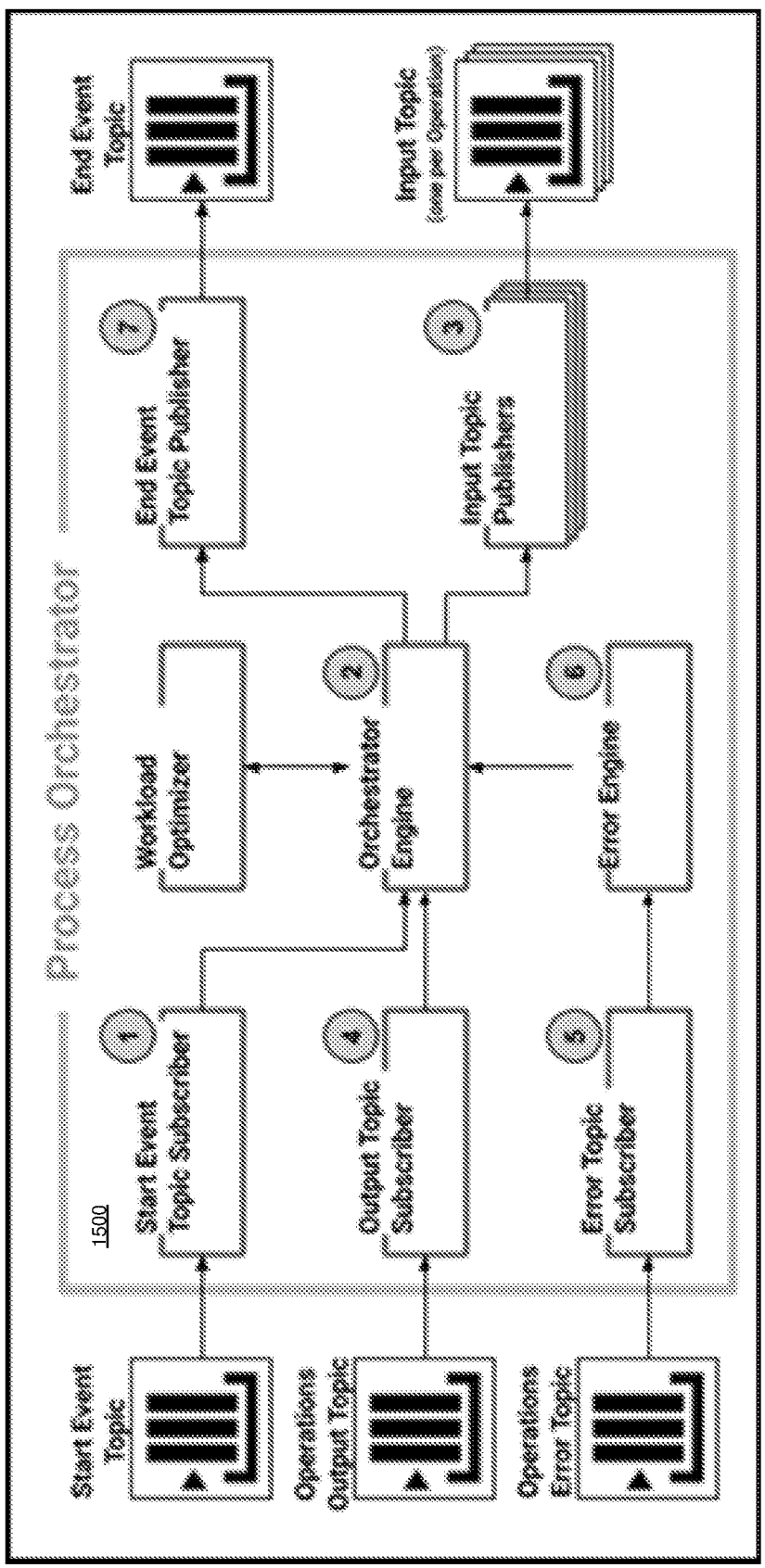
FIG. 15 illustrates an exemplary embodiment of a process orchestrator in accordance with embodiments of the present technology.

Turning now to FIG. 15, an exemplary embodiment of a process orchestrator 1500 is represented. In the illustrated embodiment, the process orchestrator 1500 is responsible for orchestrating execution of one or more operation containers. The process orchestrator 1500 comprises an input event topic subscriber (equally referred to as "start event topic subscribers"), an output topic subscriber, an error topic subscriber, a workload optimizer, an orchestrator engine (also referred to as "Process Orchestrator Engine (POE)"), an error engine, an end event topic publisher and input topic publishers. In some embodiments, the POE is configured to listen to signals of the environment in which it operates. Based on the signals, the POE may establish that one or more agents and/or a workflow of agents are to be loaded and started. In some embodiments, the POE may execute a rigid or semi-rigid execution of agents or workflows (also referred to as "orchestration") whereas, in other embodiments, the POE may execute a more flexible approach based on influencing agents and/or workflows (also referred to as "choreography").

In some embodiments, the input event topic subscriber receives a start event message. The start event message may contain attributes (e.g., reference ID and process definition ID). If one of those attributes is missing, the event may be ignored and an exception may be logged. The exception may include one or both missing attributes. The message may optionally contain a data content type and data attributes.

In some embodiments, the end event topic subscriber publishes the end event message. The end event may contain attributes such as reference ID, source, process definition ID and process instance ID. It may also comprise additional attributes such as data content type and data.

In some embodiments, the orchestrator engine is responsible for installation of a process and concurrent execution of one or more process instances. The orchestrator engine is configured using a deployment descriptor loaded at startup time or a runtime by exposing a REST API used for sending the location of the process definition and the necessary information for properly configuring a process definition. A deployment descriptor may contain one and only one process definition location and a configuration section. The deployment descriptor may contain a process definition location. The process definition location may be a URI pointing to the process definition location. The configuration section may contain information about the topics to publish and subscribe on and may contain specific POE information. The POE may fail to start if it cannot honor the deployment descriptor. When processing a deployment descriptor, the POE may execute the following steps. Step 1, validate the process against its schema. Step 2, subscribe to the required topics. Step 3, update its registered webhooks endpoints.

In some embodiments, the POE may communicate with operating containers using a publish-subscribe mechanism. The POE may publish the operation container's messages using the topic names contained in the deployment descriptor. The POE may subscribe to the operation container's messages using the topic names contained in the deployment descriptor. The POE may publish messages to an operation container using one and only one topic. Upon reception of the start event message, the POE may generate a unique process instance ID and initialize a new process instance and may immediately start its execution or queue it for later execution. In some embodiments, for routing the start event message, the POE may execute the following steps. Step 1, create the source attribute values. At step 2, create a new message containing the source, process definition and process instance ID. Carry over the data and data content type from the start event message. At step 3, lookup one or more input topic publishers on which the message may be published. In some embodiments, publishing to the input topic publishers may imply that a message is delivered to one or more operation containers.

In some embodiments, for routing subsequent messages to operation containers, the POE may execute the following steps. Step 1, advance the process instance to the next operation to execute. Step 2, lookup one or more input topic publishers that correlate the operation, using the received message's source attribute. At step 3, create a new message containing the source, process definition, process instance ID and carry over the data and data content type from the received message. At step 4, lookup one or more input topic subscribers on which the message may be published. In some embodiments, the source, process definition and process instance ID may always be carried over by every message sent and received and may never be modified. The POE may always deliver the received message body as it is, without adding or removing information. The POE may add or remove attributes on messages. The POE may listen for operation container's response using one and only one topic called output topic. In some embodiments, all operations containers respond using that topic. The POE may release and destroy resources associated with a process instance after receiving the last response from the output topic. This signifies that the last operation of a process instance has been executed and the process instance is complete.

In some embodiments, the POE may stop the process instance execution if the source attribute of the received message does not match a next operation container target; the process definition ID is missing or does not match a current process ID; the process instance ID is missing or does not match any existing process instance; the operation definition ID is unknown or does not match any value known by the POE; or the error engine asks for a cancellation. The POE may log an exception when stopping a process. The log may include the message attributes, the attribute that failed the process instance, the complete message received by the error engine and/or the topic's name from where the message was received.

In some embodiments, the POE may expose an API allowing the error engine to cancel a process using the process definition ID of the event. When invoked, the POE may mark the process for cancellation and may not instantiate any new process instance. It may also cancel all existing process instances and may invoke compensation activities. The POE may determine the exact moment the process will be cancelled. In some embodiments, the POE may expose an API allowing the error engine to cancel a process instance using the process instance ID of the event. When invoked, the POE may mark the process instance for cancellation and may invoke compensation activities, when defined. It is up to the POE to determine the exact moment the process instance will be cancelled.

In some embodiments, the POE may also expose an API for registering webhooks. An application may configure webhook endpoints via this API to be notified about events that happen during the deployment of the process. In some embodiments, webhook events may be one or more of the following events: process-created, process-ready, process-failed, process-instance-created, process-instance-ready, process-instance-failed and/or process-instance-state. In some embodiments, the process-failed may occur during one of the following scenarios: one or more resources required by the process may not be found and/or one fatal exception has been received from an operation container.

In some embodiments, the error engine may listen on the error topic. Upon reception of an event, the error engine may determine if a process or a process instance may be cancelled. The error engine may cancel a process using the process definition ID of the event. The error engine may cancel a process instance using the process instance ID of the event.

Referring now back to FIG. 15, in some embodiments, an operation container bootstrap defines an entry point when starting the operation container 1410. The operation container bootstrap may read the configurations, build from a manifest file, configure every component in the operation container 1410 and then start them. In some embodiments, the input event topic subscriber may listen to one and only one input topic. The input event topic subscriber may be able to receive events defined using an event specification. In some embodiments, the input event topic subscriber may construct an event context object from the event's attribute and a data object from the data and data content type attributes of the event. In some embodiments, the input topic subscriber may augment the event context object by adding runtime and environment information. The input topic subscriber may create a tuple containing the event context and data objects (i.e., a command) and invoke the command orchestrator. If a decoding error occurs, the input topic subscriber may create a tuple containing an event context object a decoding error object and invoke the error topic publisher. In some embodiments, the decoding error object may comprise the original event as a subfield. When the input topic subscriber is connected to a topic system that supports transactions, the input topic subscriber may not commit the transaction until the command orchestrator acknowledges the processing of the command when a decoding error occurs.

In some embodiments, the error publisher may be able to receive, from the input topic subscriber or the command orchestrator, a tuple consisting of an event context object and an optional data object. The error topic publisher may encode the event context error and optional data objects as events attributes, following an event specification and then publish the resulting event to the operations error topic.

In some embodiments, the command orchestrator may schedule execution of a command with the command executor and may track the result with the ack and nack components. If the ack component returns an acknowledgment, the command orchestrator may acknowledge the processing of the command to the input topic subscriber. If the nack component returns a denial due to an error, the command orchestrator may reschedule the execution of the command unless a threshold (e.g., max retry count) has been reached, in which case, the command orchestrator may create a tuple containing the event context object and a max retry count exceeded error object, and invoke the error topic publisher. In both of the previous cases, the command orchestrator may end by acknowledging the processing of the command to the input topic subscriber.

In some embodiments, the command executor is responsible for executing a command. Therefore, it may be able to receive a command, forward it to the communication pipe which is responsible for interacting with the external operation executor and track the result of the execution. If the operation communication pipe returns successfully, the command executor may create a tuple containing the event context object and the operation's returned data object (or void if the operation doesn't return anything) and invoke the output topic publisher. If the operation fails to execute, the command executor may create a tuple containing the event context object and an operation execution error object and then it may invoke the nack component. If the max operation execution time seconds expires, the command executor may send, via the communication pipe, a termination request to the operation executor using the terminate operation API in order to cancel the invocation of the operation. Then, it may create a tuple containing the event context object and an operation time out error object and invoke the nack component.

In some embodiments, the communication pipe operates so as to establish communication between the operation container and the external operation executor. The operation communication pipe may execute a direct in-memory call or may use a remote transport in order to invoke an external operation executor. The operation communication pipe may be able to receive a command message, send it to the external operation executor and return a command result message to the command executor. The command result may either be a command success result, if a result object was received or a command error result if an error object was received. When sending a command message to the external operation executor, the operation communication pipe may apply transport specific transformations (e.g., serialization, encoding, compression, etc.). When the operation executor returns a command result message, the operation communication pipe may apply transport specific transformations (deserialize, decode, decompress, etc.).

In some embodiments, the output topic publisher may receive from the operation executor a tuple consisting of an event context object and a data object (or void if the operation doesn't return anything). The output topic publisher may encode the event context and data objects as event attributes, following an event specification. Then, it may publish the event to one and only one operations output topic. If the output topic publisher succeeds to publish the event, the output topic publisher may acknowledge the command by invoking the ack component with the event context as a parameter. If the output topic publisher fails to publish the event, the output topic publisher may create a tuple containing the event context object, a publish error object and the optional result data object and deny the command by invoking the nack component.

In some embodiments, the ack component may acknowledge the fact that a command has succeeded to the command orchestrator by forwarding it the received event context object.

In some embodiments, the nack component may acknowledge the fact that a command has failed to the command orchestrator by forwarding it the received event context object, an error object (either a command error result of a publish error) and the optional result data object.

In some embodiments, the external operation executor is the component of the application framework that is responsible for running the actual operation. In some embodiments, the external operation executor may be executed based on an invoke function used by the operation communication pipe to communicate with the external operation executor. In some embodiments, an operation container manifest which comprises information required for configuring an operation container may be loaded as soon as the operation container is started. An non-limiting example of the operation container manifest is presented below:

| Property Name | Definition | Required |
| --- | --- | --- |
| operationDefinitionId | Unique Identifier of the operation. It is REQUIRED by the Event Specification. Note: This will be used as one part of the event source on the Output Event. | Yes |
| inputTopic | The Topic the container is listening to. | Yes |
| outputTopic | The Topic the container is publishing on. | Yes |
| errorTopic | The Topic the container is publishing Errors on. | Yes |
| maxRetryCount | Number of retries to attempt if an operation returns an error. Default: 0 | No |
| retryDelaySeconds | Minimum time, in seconds, between an error and the retry of the operation. Default: 5 | No |
| maxOperationExecutionTimeSeconds | The maximum time an operation can take to execute in seconds. Default: unlimited | No |

Still referring to FIG. 15, an exemplary embodiment of operating the process orchestrator 1500 is now described. At step 1, a message is delivered to the start event topic subscriber. At step 2, the process orchestrator engine (POE) may look up a process included in the message. The process is then loaded (if not already loaded). If the process orchestrator fails to look up the process an exception may be logged. Failure may mean that the process cannot be found or is invalid. At step 3, if a process is found, it may be instantiated and all the mandatory topics may be subscribed to. An instance ID may be generated. Then, the process instance may be initialized and started. At step 4, a message may be published to the first input topic publisher associated with the first operation container. The POE may set attributes before sending the message. At step 5, if the operation container succeeds, the POE may route the response message received from the output topic subscriber to the next operation container, via the input topic publisher, using the attribute. At step 6, if the operation container fails, an error message may be received from the error topic subscriber and the error engine may cancel the process or may ask for a retry or a complete restart. At step 7, after receiving the last response message, the POE may release and destroy all resources associated with the process instance and post a terminating message to the end event topic publisher. Any exception occurring during the execution must be logged. The POE may retry the post operation until is succeeds or fail and then log a critical error with the terminating message.

Figure 16:
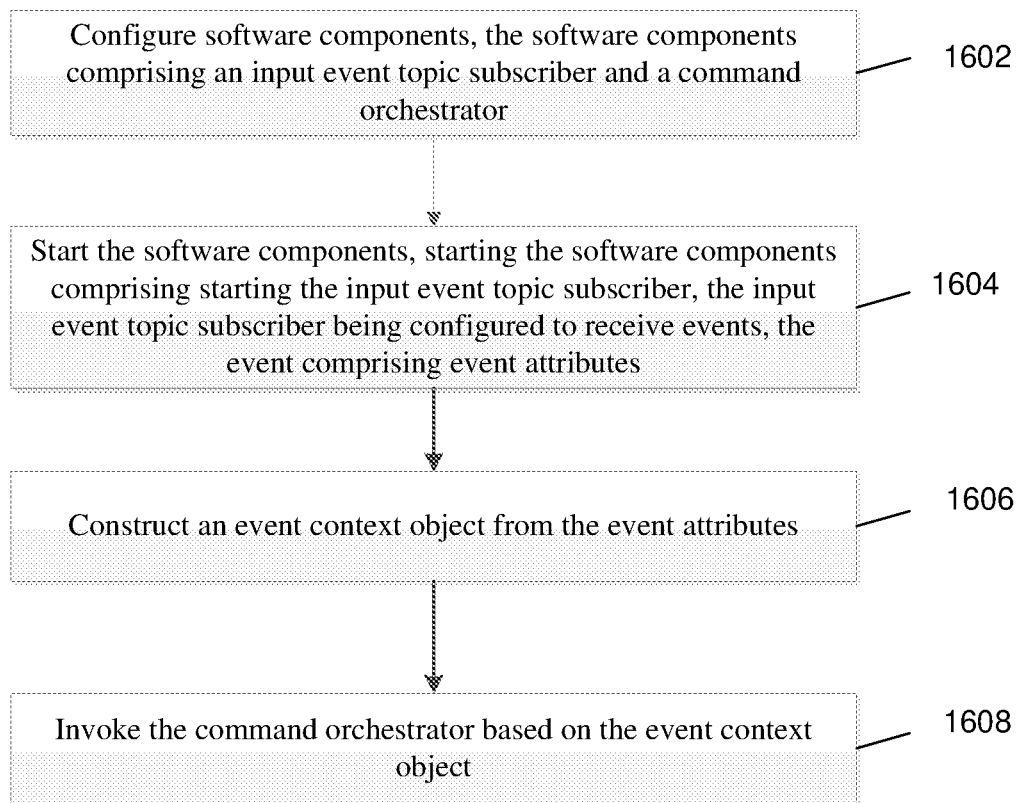
FIG. 16 is a schematic illustration of a computer-implemented method used in connection with executing an operation container comprising software components in accordance with embodiments of the present technology.

Referring now to FIG. 16, some non-limiting example instances of systems and computer-implemented methods used in connection with executing an operation container comprising software components are detailed. More specifically, FIG. 16 shows a flowchart illustrating a computer-implemented method 1600 implementing embodiments of the present technology. The computer-implemented method of FIG. 1600 may comprise a computer-implemented method executable by a processor of a computing environment, such as the computing environment 100 of FIG. 1, the method comprising a series of steps to be carried out by the computing environment.

Certain aspects of FIG. 16 may have been previously described with references to FIG. 13-15. The reader is directed to that disclosure for additional details.

The method 1600 starts at step 1602 by configuring software components, the software components comprising an input event topic subscriber and a command orchestrator. At step 1604, the method 1600 then proceeds to starting the software components by starting the input event topic subscriber, the input event topic subscriber being configured to receive events comprising event attributes. Then, at step 1606, the method 1600 proceeds to constructing an event context object from the event attributes. At step 1608, the method 1600 proceeds to invoking the command orchestrator based on the event context object. In some embodiments, invoking the command orchestrator further comprises transmitting a command to the command orchestrator, the method further comprising scheduling, by the command orchestrator, execution of the command; and tracking the execution of the command.

In some embodiments, the software components further comprises a communication pipe, the method further comprising forwarding the command to the communication pipe, the communication pipe being configured to interact with an external operation executor and track a result of the external operation executor, the external operation executor operating outside the operation container.

In some embodiments, the communication pipe is configured to send a termination request to the external operation executor if an operation execution time exceeds a threshold. In some embodiments, the communication pipe is configured to return the result of the external operation executor to the command orchestrator.

Workload Optimizer

In some embodiments, the process orchestrator 1500 also comprises a workload optimizer which is responsible for optimizing assignment of tasks and operations to agents, adhering to skill, affinity and/or other constraints. In some embodiments, the workload optimizer is configured to listen to signals/events within the application framework and persist data of interest for the future, for example, when the workload optimizer will assign operations to human agents. The workload optimizer may also be configured to deduce business insights from captured/persisted data, in the form of parameterized constraints and objectives. The workload optimizer may also assign operations to human agents.

In some embodiments, the workload optimizer may assign operations to agents based on captured data. As non-limiting examples, the captured data may include operation type, creation date/time (so as to track when instances appear in the system thereby allowing deducing amount of new operations created in per day or per hour), ready date/time (so as to track when operation instances become available for agents to execute), execution start date/time and execution end date/time, assigned agent type (e.g., human agent, AI agent, non-AI agent) and/or assigned agent. For human agents, the captured data may also include operation type, refusal of an assigned operation, availability of new agents, departure of existing agents and/or start/end time of agent day of work. In some embodiments, for tasks, captured data may also include execution start/end date/time, decision made by a client regarding a proposed offer.

Ontology

Figure 17:
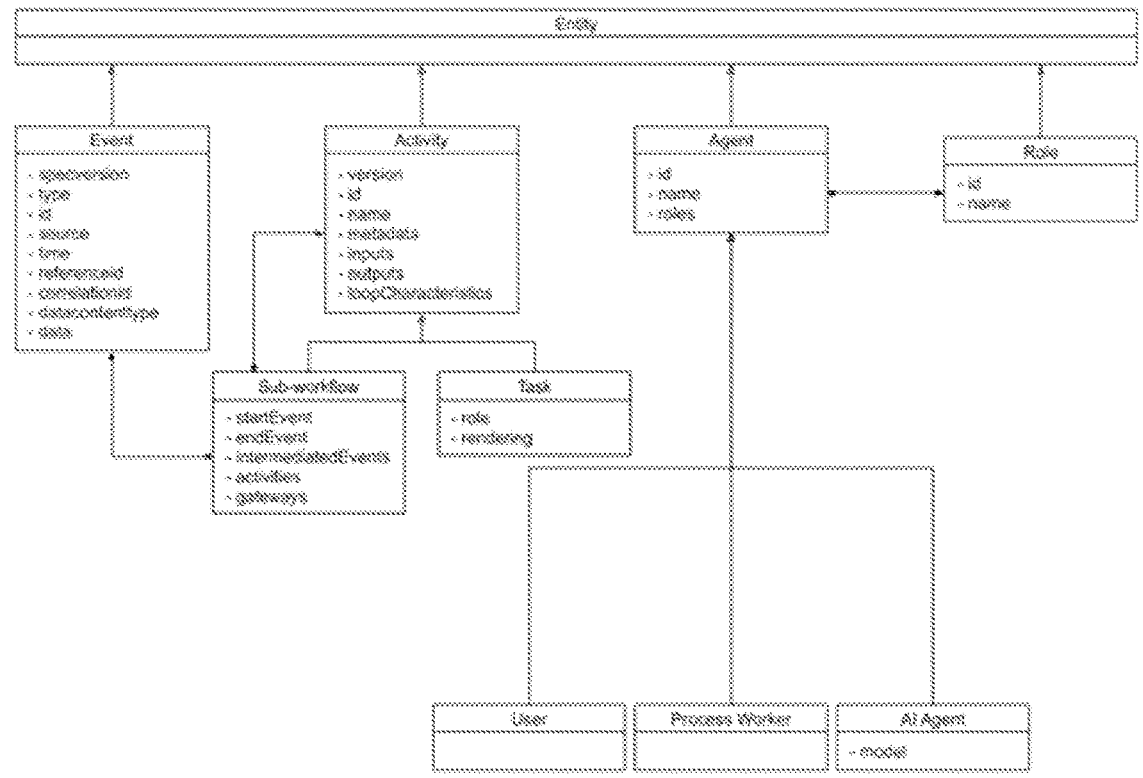
FIG. 17 illustrates an exemplary embodiment of a workflow enabling an ontology concept in accordance with embodiments of the present technology.
Figure 17:
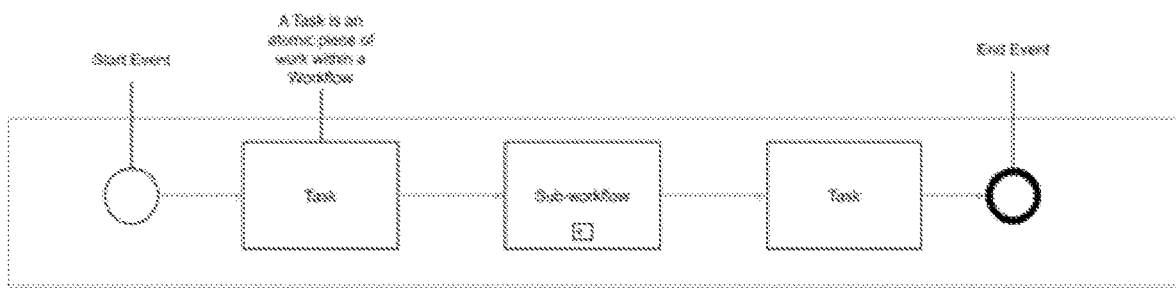

As previously explained, the present technology may enable a formal representation of knowledge, also referred to as "ontology", based on a set of concepts within a given domain along with relationships between those concepts. In some embodiments, a workflow enabling a concept of ontology may be qualified as a collection of related, structured activities executed by agents which, in accordance with a specific sequence, produce a service and/or a product for a particular customer or customers. An exemplary embodiment of a workflow 1700 enabling an ontology concept is illustrated at FIG. 17. In this example, once a start event triggers the execution of the workflow, one or more tasks may be executed, in series or in parallel. In some embodiments, a task may be defined by an atomic piece of work within the workflow. Each task may also be associated with sub-workflows.

In some embodiments, the ontology concept is based on one or more signals which may be broadcasted within the operating environment. In some embodiments, ontology may be based on a system type description for events that are broadcasted within one or more signals. In some embodiments, ontology may be further based on a structure for subjects broadcasted in the one or more signals so that agents (e.g., AI agents) may be linked together, listen to signals that are relevant to them and/or broadcast/emit/capture relevant signals.

In accordance with embodiments of the workflow 1700, a start event may trigger the start of a task. An end event may indicate where a path of a task will end. An intermediate event may be indicative of an event occurring between the start and the end of a task. In some embodiments, reference may be made to an activity which may define work that is executed. An activity may be atomic or non-atomic. Types of activities may be sub-workflow and task. The activity may have a version, a unique identifier and a name. The activity may have a lifecycle characterizing its operational semantics. The activity may have a state which defines its current state and possible transitions. Activities may often need data in order to execute. The activity may define a set of inputs to capture data requirements. Activities may produce data during or as a result of execution. The activity may also define a set of outputs for data that is produced during the execution. The activity may be performed once or may be repeated. If repeated, the activity may have loop characteristics that define repetition criteria. Loop characteristics may define a standard loop behavior or a multi-instance loop behavior.

In some embodiments, a sub-workflow may be a compound activity which may be broken down into a finer level of details through a set of "sub-activities". A sub-workflow may start upon receiving an appropriate event and may send an appropriate event when it ends. A sub-workflow may contain at least one activity. A sub-workflow may contain gateways to control the flow within the sub-workflow.

In some embodiments, a task may be defined as an atomic activity that is included within a sub-workflow. A task may not be broken down to a finer level of detail. A task may be executed by an agent and may require specific roles in order to restrict which agent can be assigned to it. A task may define a rendering to be shown when it is executed by a human agent. Human-in-the-loop is a specific example of this where user interface is shown to the human agent for validation and correction of an AI model inference.

In some embodiments, an agent is a human or an automated software application that can execute tasks. In some embodiments, there may be three types of agents, human agent, process worker agent and AI agent. An agent may have a unique identifier and a name. An agent may assume one or several roles. Agents may be interchangeable and may be combined in order to execute tasks. A user agent may be a human that can execute an operation. A user agent may interact with a user interface to complete an operation.

In some embodiments, a process worker agent is an automated software application that may execute an operation. A process worker may have a version.

In some embodiments, an AI agent may be an autonomous decision-maker that has learned how to execute an operation. The AI agent may define an associated model which has learned how to execute the operation. The AI agent may have a version.

In some embodiments, a role may represent a function assumed by the agent for executing a task. The role may define who is responsible for executing a task. A role may have a unique identifier and a name.

In some embodiments, a gateway may be used to control how activities may interact as they converge and diverge within a task. A gateway may imply that there is a gating mechanism that either allows or disallows passage through the gateway.

Application Framework+Ontology

Figure 18:
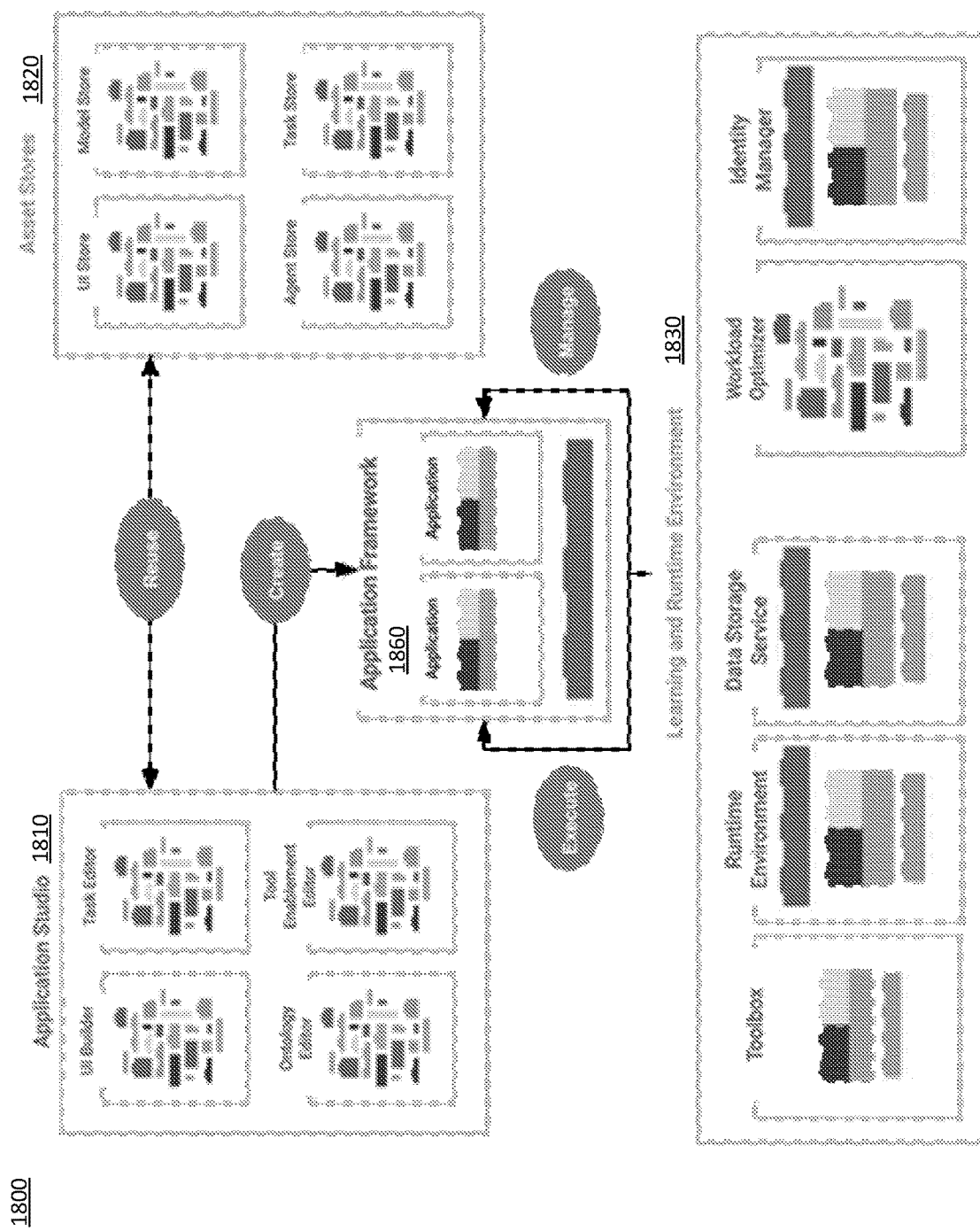
FIG. 18 illustrates an application framework in accordance with embodiments of the present technology.

Referring now to FIG. 18, an application framework 1860 (e.g., the application framework 1300) enabling an operating environment 1800 (e.g., the operating environment 200) is depicted. The application framework 1860 comprises an application studio 1810, an asset store 1820 and a learning and runtime environment 1830. Amongst multiple benefits, an operating environment enabled by the application framework 1860 provides a delivery platform to streamline and simplify product building and deployment as well as collection of decision data to train AI on specific tasks. Such streamlining and simplifying ease the access to AI-based technologies to individuals and/or organisations which do not necessarily have AI expertise and/or software engineering teams. The operating environment 1800 comprises common set of components that contribute to the construction of features from the application studio 1810 (e.g., roles, agents, tasks, ontology, etc). The operating environment 1800 comprises a common set of tools to enable building of products as well as configuring and monitoring of products. The operating environment 1800 also comprises the application framework 18600 which encodes and enforces standardization of all standard application framework elements at the software architecture level by providing standard mechanisms to manage, train, deploy and upgrade AI models. The application framework 18600 also defines a common application runtime to execute tasks, optimize workflows, manage resources, link data set.

In some embodiments, the application studio 1810 comprises four editors, namely a user interface (UI) builder, a task editor, an ontology editor and an AI enablement editor. The UI builder may comprise a set of predefined UI components that can be associated with an entity when a user interaction is required. The tasks editor may operate an interface to visually assemble and connect entities like tasks, operations, agents and/or roles. The interface may allow adding, arranging, deleting and/or connecting entities.

In some embodiments, the application framework 1860, as previously detailed, may comprise a set of APIs, components, services, functions and configurations for building application. The application framework 1860 may comprise software interface and concrete implementation of the entities described above and may be used to provision the application studio 1810. The application framework 1860 may be used in the context of creating components, services and/or functions.

In accordance with some embodiments, an application package may consist of a set of tasks, operations, agents, roles and UI components. An application may be configured, deployed and executed by the runtime environment. An application may be constructed using the components, services and functions available from the application framework. An application may be assembled using the application studio 1810.

In some embodiments, the learning and runtime environment 1830 comprises a toolbox, a runtime environment, a data storage service, a workload optimizer and an identity manager. The runtime environment may provide automatic deployment, scaling, execution and/or management of applications. The toolbox may allow users to transform raw data into production-grade solutions by easing onboarding, model training and benchmarking and deployment at scale. The data storage service is where collected data is stored. The workload optimizer allows configuration and orchestration of the runtime environment for the set-up, performance and monitoring of applications, for example, for picking an agent to execute an operation. The identity manager may define a framework of policies and technologies for controlling accesses.

In some embodiments, the asset store 1820 comprises an UI store, a model store, an agent store and a task store. The asset store 1820 allows an application developer to use existing UI components from the UI designer tool. The agent store allows an application developer to use specific agents (process worker or AI agents). The model store allows an application developer to use existing models. The task store allows an application developer to use specific tasks and/or operations.

Figure 19:
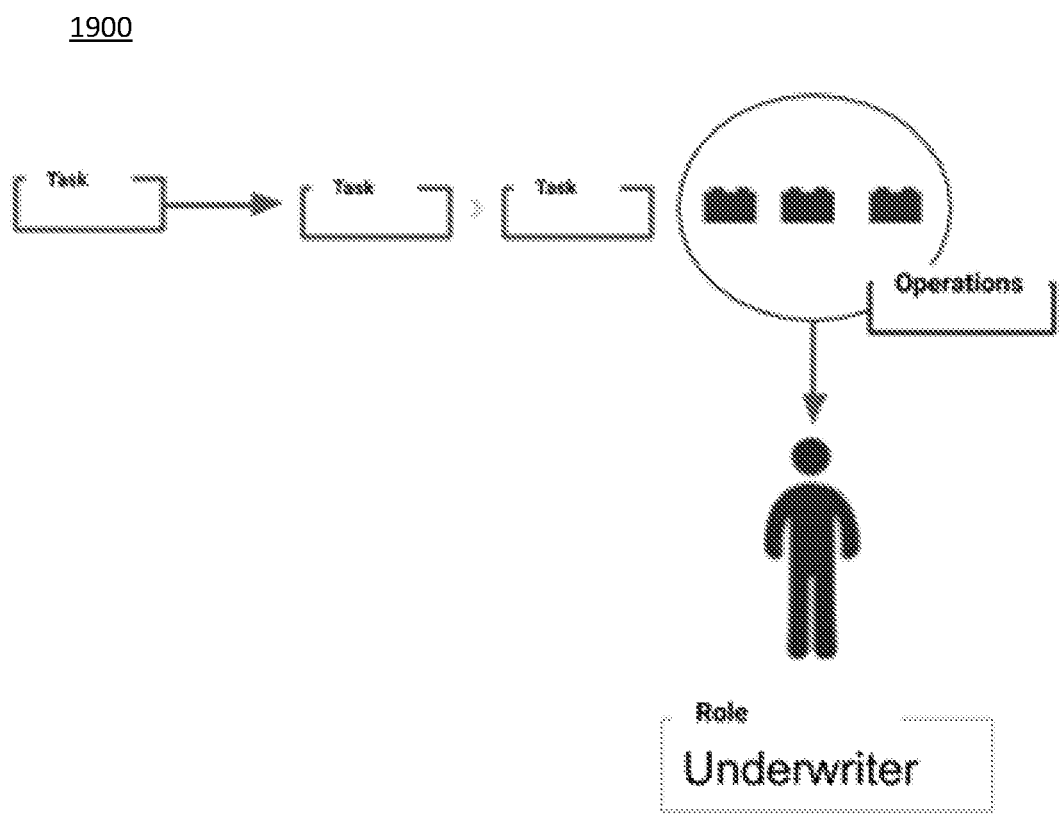
FIG. 19-23 illustrate use cases in accordance with embodiments of the present technology.

Turning now to FIG. 19, a first use case 1900 of the operating environment 1800 is depicted. The first use case 1900 aims at modeling underwriter tasks, sub-tasks, operations and roles using entities. In this example, the underwriter role consists of processing submissions. Entities modeling the role are task: processing submissions; role: underwriter; sub-tasks: receive, segment, extract, validate, publish; operation: process the submission; agent: user.

Figure 20:
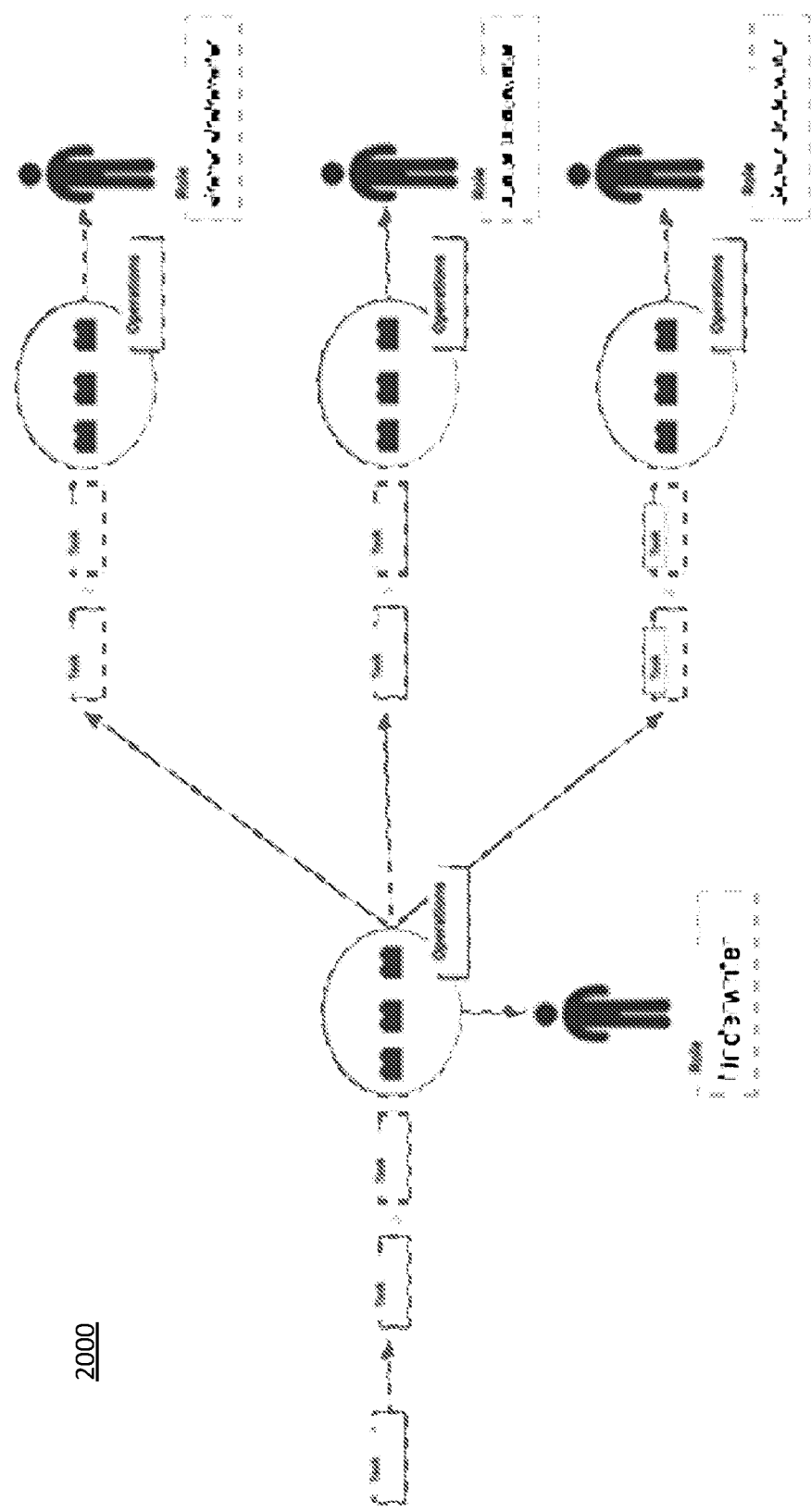

Turning now to FIG. 20, a second use case 2000 of the operating environment 1800 is depicted. In the second use case 2000, the underwriter receives a high number of tasks to execute and has access to a team of junior and senior underwriters to whom tasks may be dispatched. Under the second use case 2000, entities modeling the role are task: triaging submissions; role: underwriter; sub-tasks: triage task (choose when to dispatch to senior versus junior underwriter); operation: triage the submission by choosing to who the task should be dispatched; agent: user.

Figure 21:
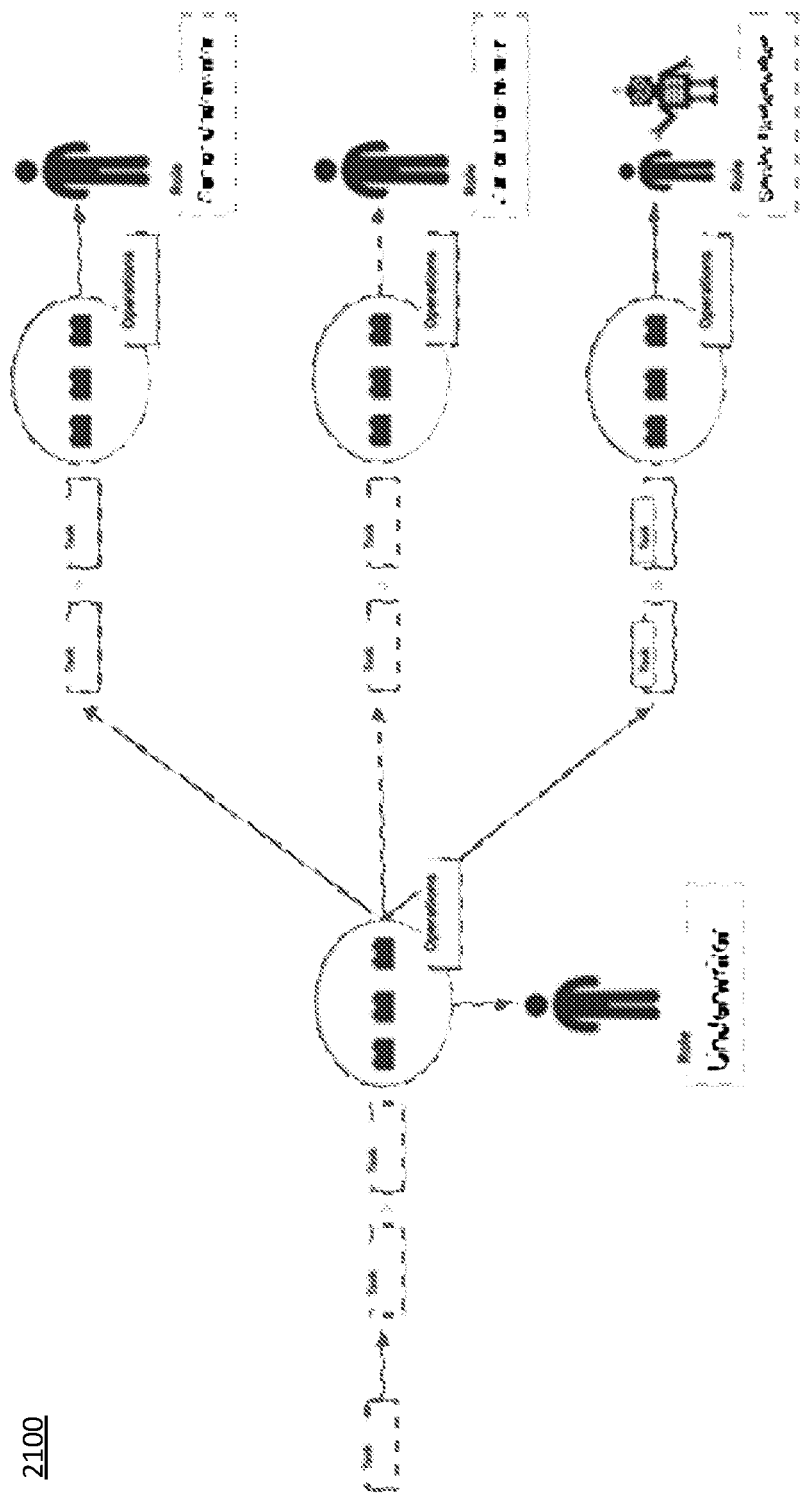

Turning now to FIG. 21, a third use case 2100 of the operating environment 1800 is depicted. In the third use case 2100, a process worker that collects operations of one of the senior underwriters is associated. The process worker operates as an apprentice.

Figure 22:
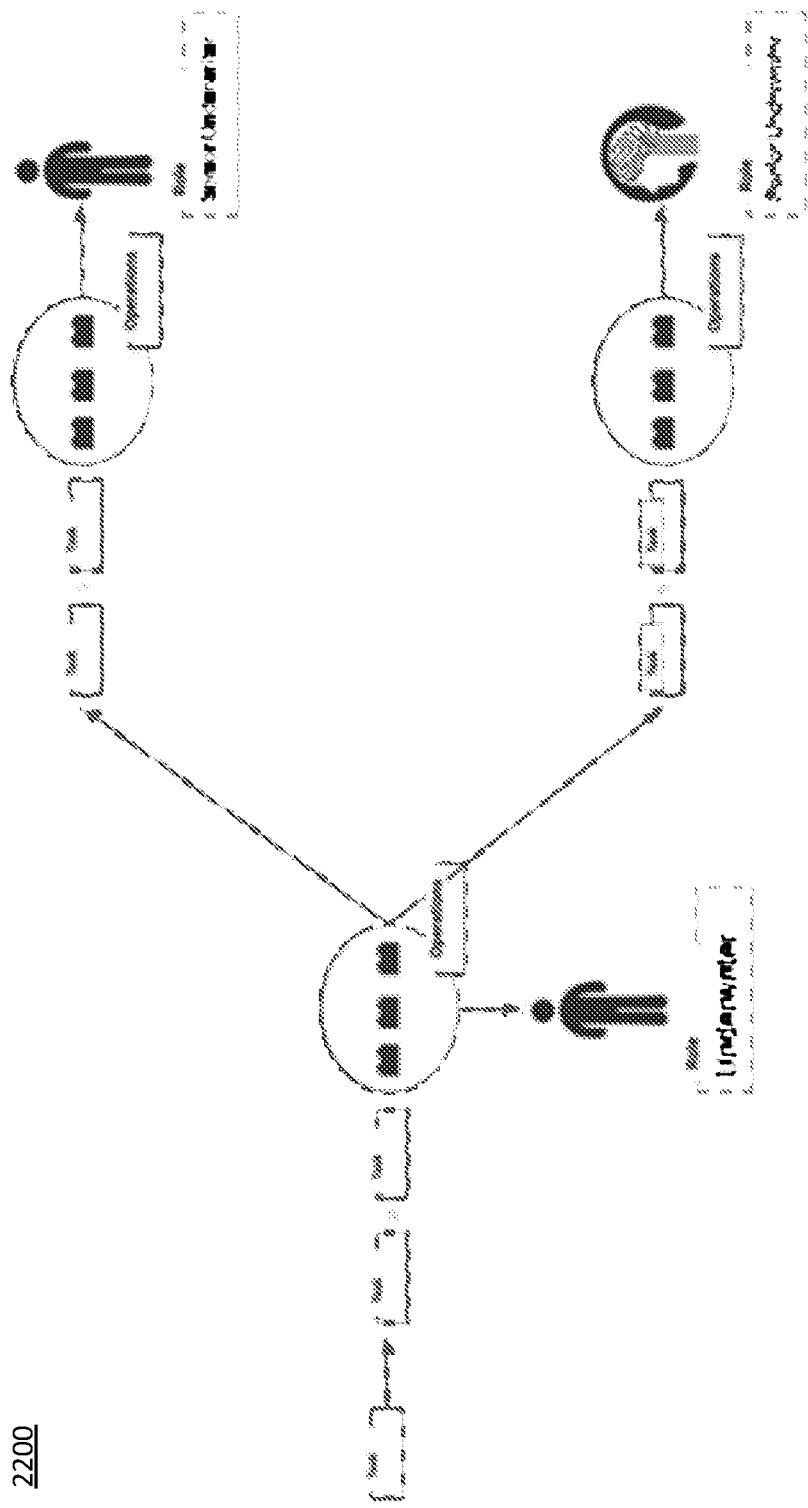

Turning now to FIG. 22, a fourth use case 2200 of the operating environment 1800 is depicted. In the fourth use case 2200, once the process worker has collected enough data, it may augment the underwriter.

Figure 23:
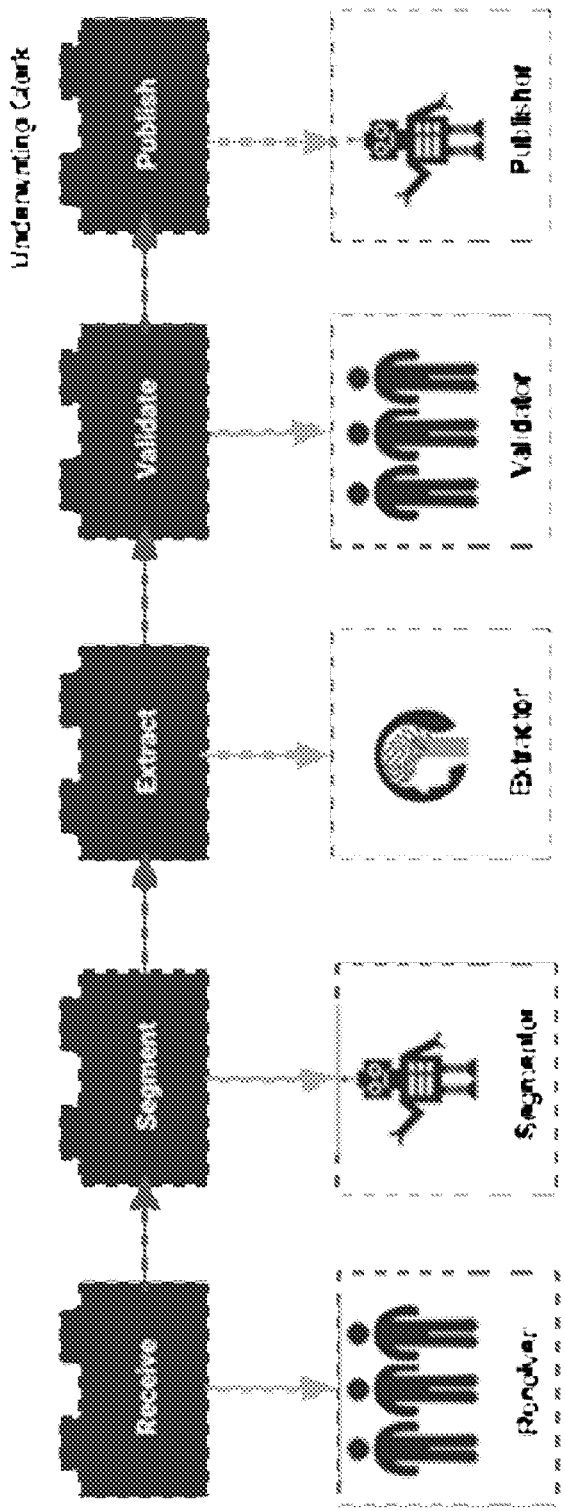

Turning now to FIG. 23, a fifth use case 2300 of the operating environment 1800 is depicted. In the fifth use case 2300, a process "submitting a submission" is divided into five sub-tasks. A first sub-task "receive a submission" consists of collecting required information. The role is named "Receiver" and associated agents are a set of users. A second sub-task "segment the submission" consists of formatting the submission in the format required by the next sub-task. The role is named "Segmenter" and the associated agent is a process worker. A third sub-task "extract the entities" consists of extracting the entities from the second sub-task. The role is named "Extractor" and the associated agent is an AI agent. A fourth sub-task "validate the entities" consists of validating the result of the third sub-task. The role is named "validator" and the associated agents are either a set of users of an AI agent. Under that scenario, a process worker may decide, based on a confidence score, whether it may handle the request on its own or whether it should dispatch the result to either a user or an AI agent. A fifth sub-task "publish the entities" which consists of publishing the result of the fourth sub-task to an external entity (e.g., external service or database). The role is named "publisher" and the associated agent is a process worker.

Figure 24:
FIG. 24 illustrates an exemplary embodiment of a monitoring interface in accordance with embodiments of the present technology.

In some embodiments, some agents may be interchangeable as they may execute a same role. For example, a process worker may take the role of triaging execution of a sub-task to a set of users or an AI agent. In some cases, it may make sense to have a process worker or an AI agent make decision on triage of a task to user or AI agent. There may also be the possibility of an AI agent having a confidence score on its decision-making output. In the case where the confidence score drops below a specific threshold, input may be requested from a user. The input from the user may be subsequently be used to retrain the model for an AI agent to ensure better performance on subsequent similar instances. OS+Monitoring+Use Case In accordance with embodiments of the present technology, the operating environment 200, 1800 operates a monitoring system and a monitoring interface to provide a user with an overview of AI model performance metrics alongside business level KPIs. The monitoring system and the monitoring interface thereby provides visual indicators, tracked over time, of business impacts of one or more AI projects operated by the operating environment 200. An exemplary embodiment of a monitoring interface 2400 is illustrated at FIG. 24. In some embodiments, a change in business KPI may result in a change in AI solution behavior which, in turn, changes the business process. One affects the other, and vice versa, resulting in a tight iteration loop between AI and business teams.

Figure 25:
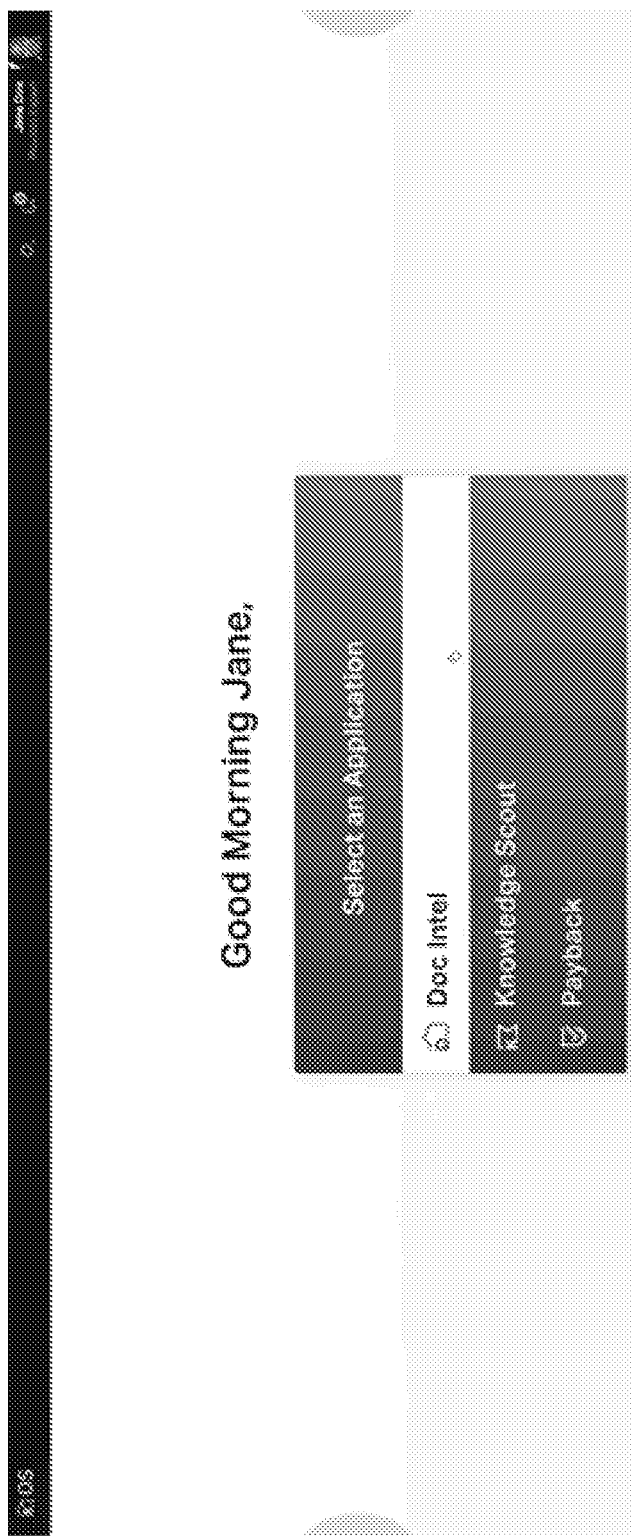
FIG. 25-30 illustrate an exemplary embodiment of a use case of an operating environment in accordance with embodiments of the present technology.
Figure 26:

Turning now to FIG. 25-26, an exemplary embodiment of a use case of the operating environment 200 is depicted. A user is prompted, at a first screen 2500, to select an AI solution amongst multiple available. Even though reference is made to an AI solution, it should be understood that this aspect is not limitative and AI solution may broadly encompass concepts such as AI agents, non-AI agents, AI products, non-AI products, AI custom projects and/or non-AI custom projects. In the example of FIG. 25, the user selects the AI solution "Doc Intel" amongst a list comprising "Doc Intel", "Knowledge Scout" and "Payback". The selection of the AI solution provides a single point of entry to centrally view, monitor and/or manage all AI solutions deployments. In this example, the AI solution "Doc Intel" provides AI document processing functionalities for management of high volumes of invoices.

Once the user has selected the AI solution "Doc Intel" a second screen 2600 displays monitoring information relating to the "Doc Intel". The second screen 2600 comprises a dashboard comprising business KPIs (e.g., KPIs specific to the organization in which the operating environment 200 is operating) and performances of the AI solution. In the example of the AI solution "Doc Intel", the dashboard displays a number (i.e., volume) of documents that the AI solution "Doc Intel" is able to treat, time to be spent by a human to validate "Doc Intel" information and a percentage of information delivered by "Doc Intel" which is correct. The dashboard provides task level KPIs to allow a user to assess performance of the AI solution (e.g., is a ranking useful, is the ranking in the right order, how many times a template is identified, if so is it the right template, etc). As previously mentioned, the dashboard allows monitoring of business level KPIs as well as lower level model performance metric.

Figure 27:
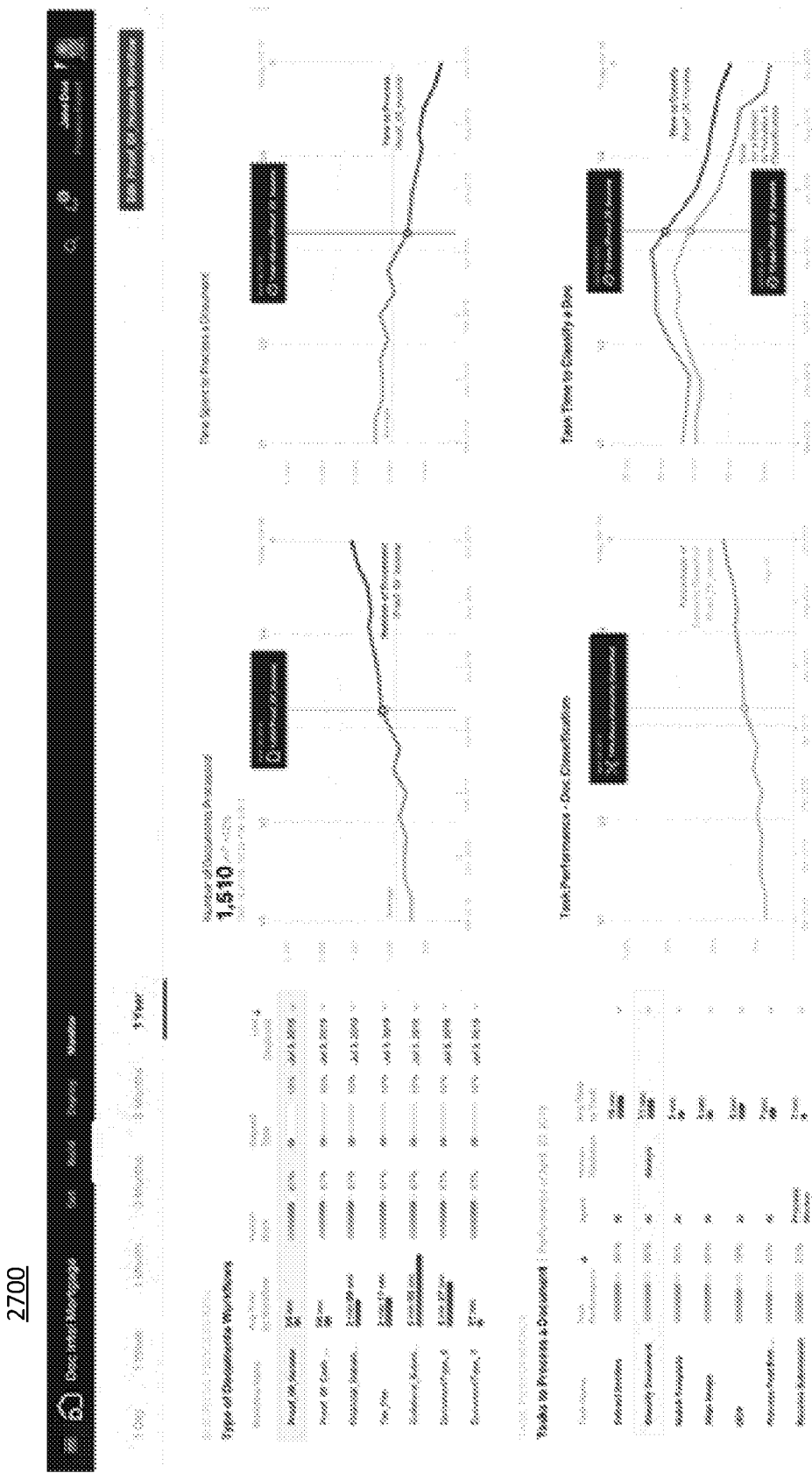

FIG. 27 illustrates a third screen 2700 displaying extraction performance. By reviewing the third screen 2700, a user may determine whether one or more workflows of the AI solution perform correctly. In some embodiments, the third screen 2700 may comprise a list of workflows and associated performances. The third screen 2700 may also provide access to performances associated with tasks and/or sub-tasks of the one or more workflows. The third screen 2700 may also provide access to a workflow editor.

Figure 28:
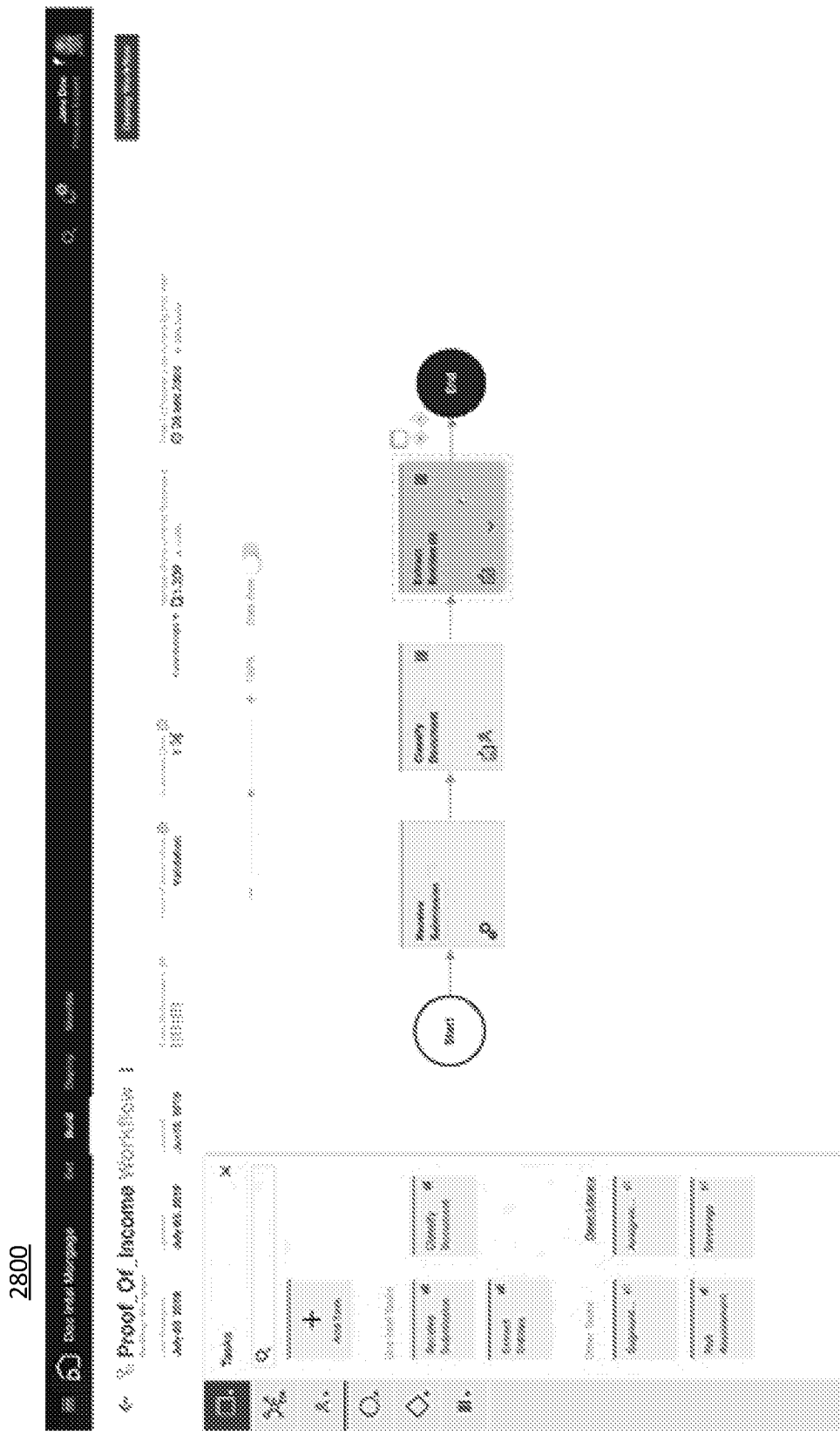

Turning now to FIG. 28, a first exemplary interface 2800 of a workflow editor is illustrated. A first level of a workflow is displayed. The workflow comprises three tasks (receive submission, classify document, extract entities), a start event and an end event. A list of predefined tasks, agents and AI models is also displayed on the left side of the exemplary interface 2800. The user may also import assets from an asset store (e.g., the asset store 1820). In some embodiments, the modeled workflow illustrated at FIG. 28 maps a business process of the organisation in which the operating environment 200 is operating. As previously detailed, the operating environment 200 enables data connectors which may operate as input and/or output of the workflow.

Figure 29:
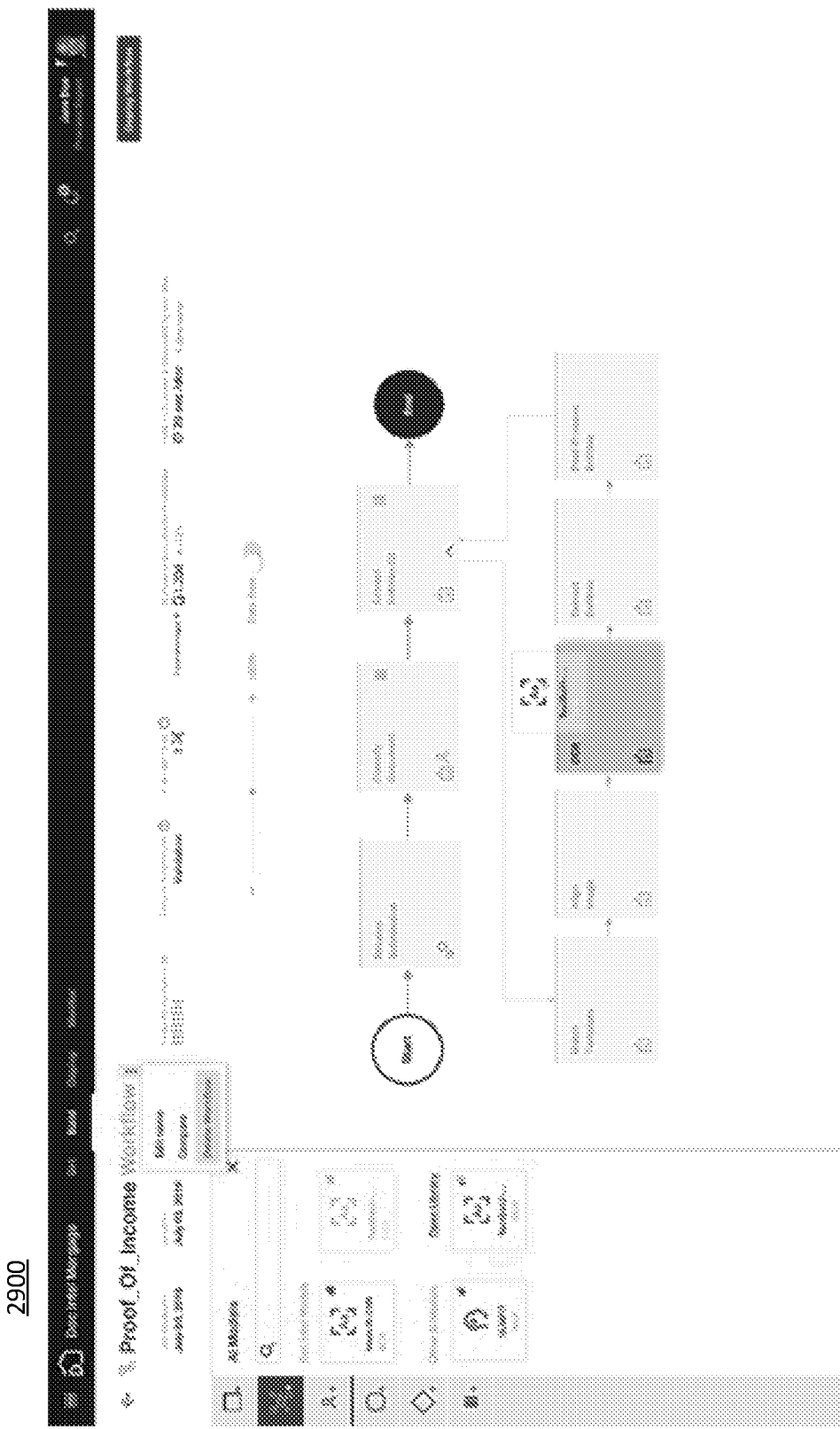

Turning now to FIG. 29, a second exemplary interface 2900 illustrates a sub-workflow associated with the task "extract entities" of the workflow displayed at the first exemplary interface 2800. The sub-workflow comprises sub-tasks (i.e., "match template", "align images", "OCR", "extract entities", "post-process entities"). In some embodiments, the sub-workflow may comprise different types of agents (e.g., human agent, AI agent, etc). In some embodiments, a smallest atomic part of the sub-workflow is an AI model. In some embodiments, the workflow may comprise a collection of multiple AI models linked together. In some embodiments, the first exemplary interface 2800 and the secondary exemplary interface 2900 provides visibility on an end-to-end chain of AI models allowing accurate measurement of a business impact of the AI solution.

In some embodiments, and as previously detailed, the operating environment 200 allows interaction between human users and AI agents. In some embodiments, a first task of the workflow may be fully executed by a human agent while a second task of the workflow may be fully executed by an AI agent. In some other embodiments, a third task of the workflow may be executed by an AI agent and reviewed by a human agent. The operating environment 200 may also be used to evaluate human agent in real time and/or manage a workforce of human agents.

In some embodiments, the operating environment 200 may provide functionalities for AI model retraining in a production environment, based on human input, new data availability (new source and type, or more) and/or corrections of AI model outputs, also referred to as active learning.

Figure 30:
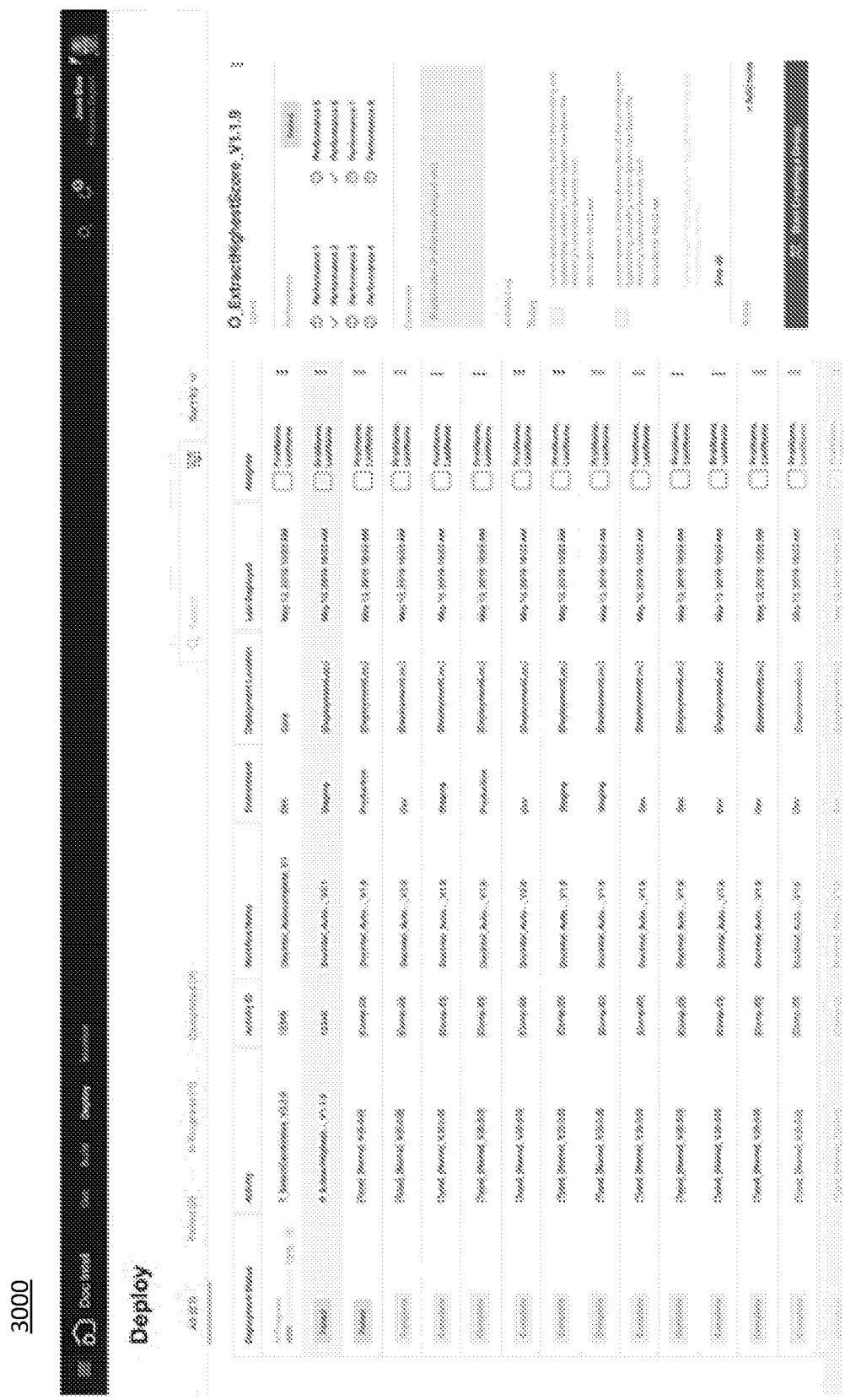

Turning now to FIG. 30, an example of deployment 3000 of the workflow of FIGS. 28 and 29 is illustrated. The deployment of the workflow may have been commended by the user, once the workflow has been properly updated. The deployment of the workflow may cause an update of the AI solution in production (in this example, the "Doc Intel" solution). As a result of the functionalities provided by the operating environment 200, the user may dynamically update workflows and push the updates into productions instantaneously providing better control and visibility on impacts of modifications made to the workflow. In some embodiments, flexibility of the operating environment 200 is enabled, at least in part, by the application studio 1810 which enables modular assembly of AI solutions from existing AI capabilities while enforcing standards in how agents are pieced together.

Figure 31:
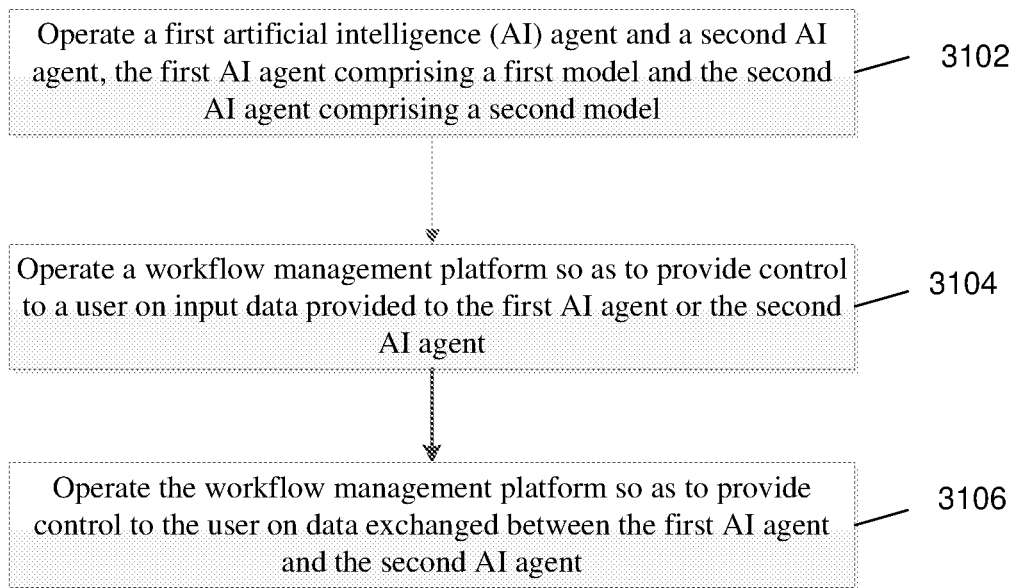
FIG. 31-32 are schematic illustrations of computer-implemented methods used in connection with executing an operating environment in accordance with embodiments of the present technology.

Referring now to FIG. 31, some non-limiting example instances of systems and computer-implemented methods used in connection with executing an operating environment are detailed. More specifically, FIG. 31 shows a flowchart illustrating a computer-implemented method 3100 implementing embodiments of the present technology. The computer-implemented method of FIG. 3100 may comprise a computer-implemented method executable by a processor of a computing environment, such as the computing environment 100 of FIG. 1, the method comprising a series of steps to be carried out by the computing environment.

Certain aspects of FIG. 31 may have been previously described with references to FIG. 24-30. The reader is directed to that disclosure for additional details.

The method 3100 starts at step 3102 by operating a first artificial intelligence (AI) agent and a second AI agent, the first AI agent comprising a first model and the second AI agent comprising a second model. Then, at step 3104, the method 3100 proceeds to operating a workflow management platform so as to provide control to a user on input data provided to the first AI agent or the second AI agent. At step 3106, the method 3100 proceeds to operating the workflow management platform so as to provide control to the user on data exchanged between the first AI agent and the second AI agent.

In some embodiments, the first AI agent and the second AI agent are operated in series so as to define a workflow. In some embodiments, the workflow management platform is further configured to allow human input on a configuration associated with the workflow. In some embodiments, the human input causes a retraining of at least one of the first model or the second model. In some embodiments, the workflow management platform is configured to push updates of at least one of the first model or the second model into production without interrupting operations of the operating environment.

Figure 32:
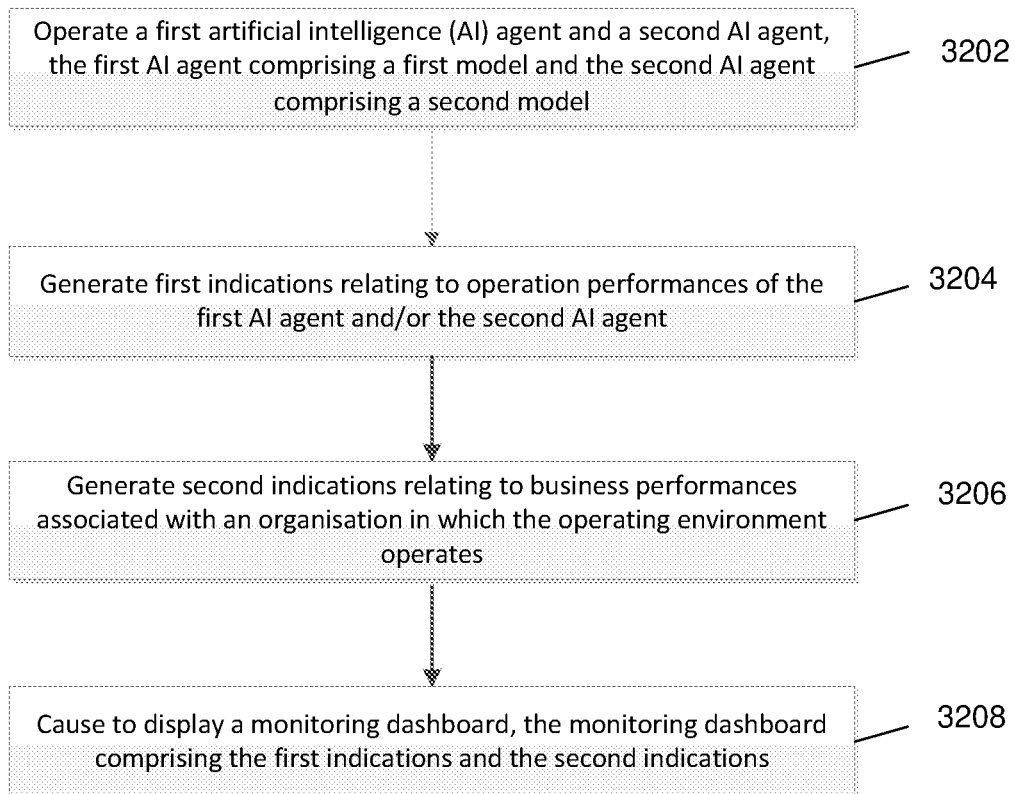

Referring now to FIG. 32, some non-limiting example instances of systems and computer-implemented methods used in connection with executing an operating environment are detailed. More specifically, FIG. 32 shows a flowchart illustrating a computer-implemented method 3200 implementing embodiments of the present technology. The computer-implemented method of FIG. 3200 may comprise a computer-implemented method executable by a processor of a computing environment, such as the computing environment 100 of FIG. 1, the method comprising a series of steps to be carried out by the computing environment.

Certain aspects of FIG. 32 may have been previously described with references to FIG. 24-30. The reader is directed to that disclosure for additional details.

The method 3200 starts at step 3202 by operating a first artificial intelligence (AI) agent and a second AI agent, the first AI agent comprising a first model and the second AI agent comprising a second model. Then, at step 3204, the method 3200 proceeds to generating first indications relating to operation performances of the first AI agent and/or the second AI agent. At step 3206, the method 3200 proceeds to generating second indications relating to business performances associated with an organisation in which the operating environment operates. Then, at step 3208, the method 3200 proceeds to causing to display a monitoring dashboard, the monitoring dashboard comprising the first indications and the second indications.

In some embodiments, the method 3200 further comprises operating a workflow management platform so as to provide control to a user on a workflow comprising the first AI agent and the second AI agent; and causing to display a user interface associated with the workflow management platform.

In some embodiments, the method 3200 further comprises receiving inputs from the user via the user interface, the inputs relating to modifications to be made to the workflow.

In some embodiments, the method 3200 further comprises generating modifications to the workflow, the modifications relating to a configuration of at least one of the first AI agent or the second AI agent.

In some embodiments, the method 3200 further comprises updating at least one of the first AI agent or the second AI agent based on the modifications while the at least one of the first AI agent or the second AI agent remains in production.

In some embodiments, the method 3200 further comprises updating at least one of the first indications and the second indications; and causing to display an updated version of the monitoring dashboard, the updated monitoring dashboard comprising the updated first indications and the updated second indications.

Figure 33:
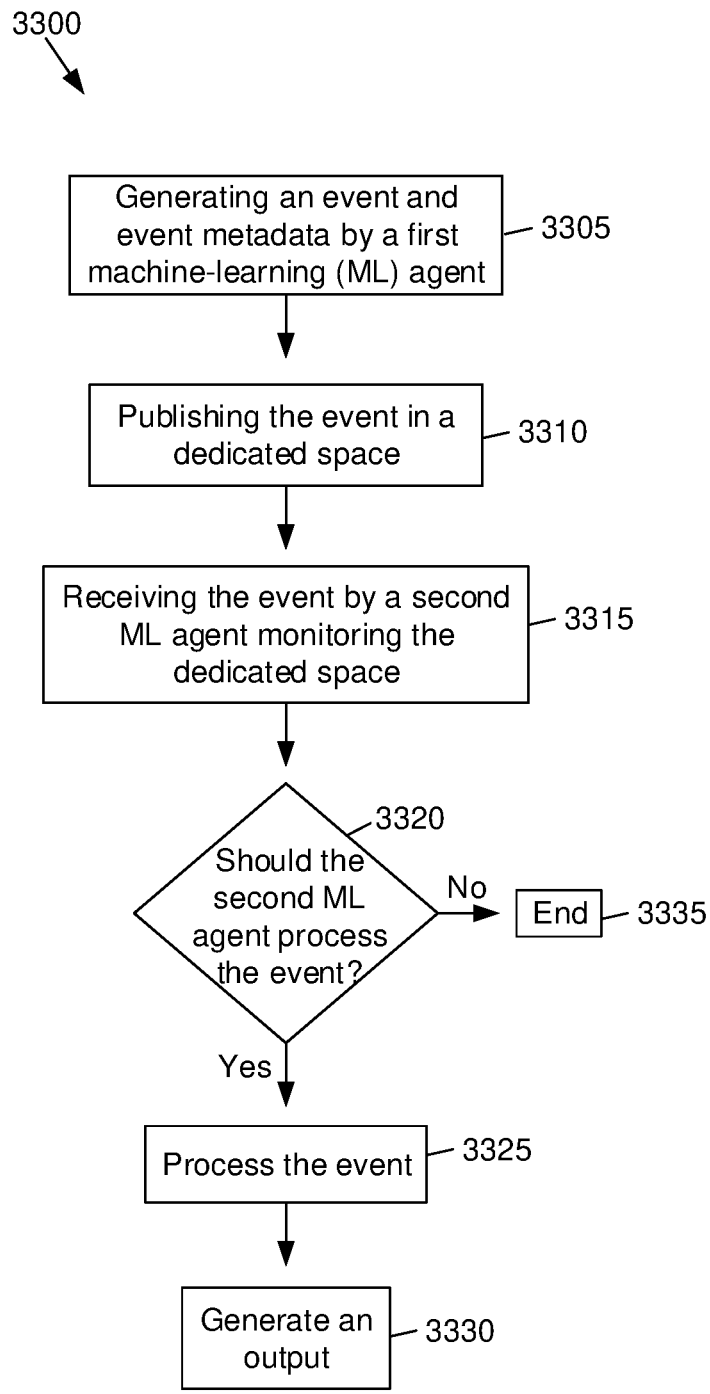
FIG. 33 illustrates a flow diagram of a method for monitoring and processing events in accordance with embodiments of the present technology.

FIG. 33 illustrates a flow diagram of a method 3300 for monitoring and processing events in accordance with embodiments of the present technology. The method 3300 may be used for publishing and/or processing events.

At step 3305 an event and event metadata may be generated by a first ML agent. An event may occur during the course of a workflow. The event may be generated by an agent, such as an ML agent and/or AI agent. For example an agent may emit intermediate events while processing received input, such as to give intermediate results, to propagate metrics linked to the processing or to give progress of the process, etc. The agent may also send an event indicating that processing was completed successfully or completed with errors.

The first ML agent may include one or more service meshes. The service mesh may encapsulate state and/or behavior of the ML agent. The service mesh may comprise multiple pieces of code related together with the goal to predict something. The state and behavior may indicate the internal mechanism of the mesh. When the ML Agent is executed, based on the input data it receives it may use all of its internal component or a portion of them. The ML may track its predictions state and the components it uses in the service mesh.

The event may comprise metadata of the event. The metadata may include context information, such as a unique identifier of the event, a source of the event, a timestamp indicating when the event was generated, and/or a workflow reference indicating the workflow that generated the event. The event may also comprise event data, which may be the output produced by the agent that generated the event.

The event may be an intermediate event, which may be generated while processing an event. Some agents may output intermediate results and/or send intermediate events. For example an OCR/NLP model configured to extract all occurrences of a specific word and the context information around it from a large source could emit intermediate events that contain the results found up to that point during execution and information about the progress of the execution, such as an amount of input data remaining to process. Other agents may then react to these intermediate events. For example, another agent could stop the execution of the agent because the intermediate event indicates that the specific information being searched for was found and there is no reason to search further. Another example is that intermediate results could be published during recursive training such as each time the training loop is restarted with smaller, more targeted parameters. Another agent could analyze the intermediate results and stop the training after the improvement gains are determined to be minimal.

The event may include a partial representation of an ML model. For example the event may include a portion of the model layer of the ML model. The model parts may then later be reassembled or partially assembled at runtime.

At step 3310 the event is published in a dedicated space. The dedicated space may be a cloud-based storage for events. The event may be published to one or more input event subscribers that may listen for events. The dedicated space may be a virtualized dedicated space. Intermediate events may be published based on a confidence level associated with the event. For example if a confidence associated with the intermediate event is below a threshold, the event may be published to the dedicated space.

At step 3315 the event may be received by a second ML agent monitoring the dedicated space. The event may be received by an input event subscriber of a workflow that contains the second ML agent.

At step 3320 a determination may be made as to whether the second ML agent should process the event. The workflow that includes the second ML agent may define whether the second ML agent should process the event. Filters and/or rules may be used to determine whether the second ML agent should process the event. If a determination is made that the second ML agent will not process the event, the method 3300 ends at step 3335.

If a determination is made that the second ML agent should process the event, the second ML agent may process the event at step 3325. The second ML agent may be an inference agent configured to generate a prediction based on the event, a learning agent configured to execute further training a model based on the event, and/or an inference/learning agent configured to generate a prediction by the second model based on the event and execute further training a model based on the event.

At step 3330 an output may be generated. The output may be the output of the second ML agent after processing the event.

Figure 34:
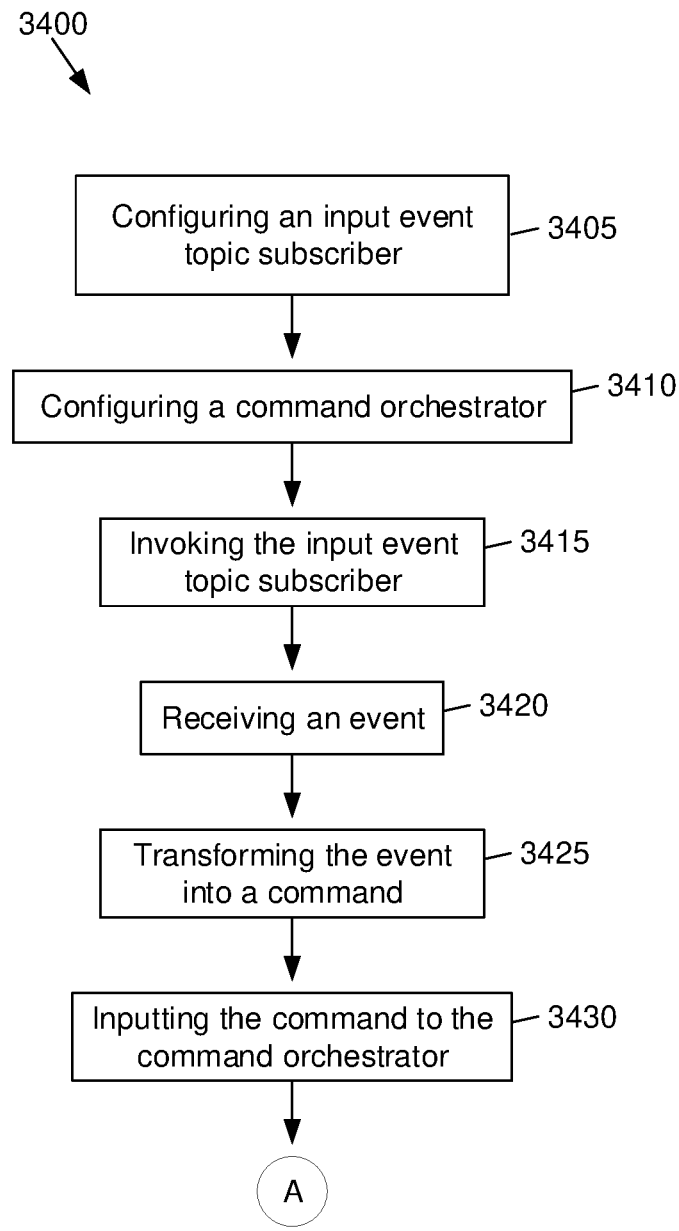
FIG. 34-35 illustrate a flow diagram of a method for managing a command in accordance with embodiments of the present technology.
Figure 35:
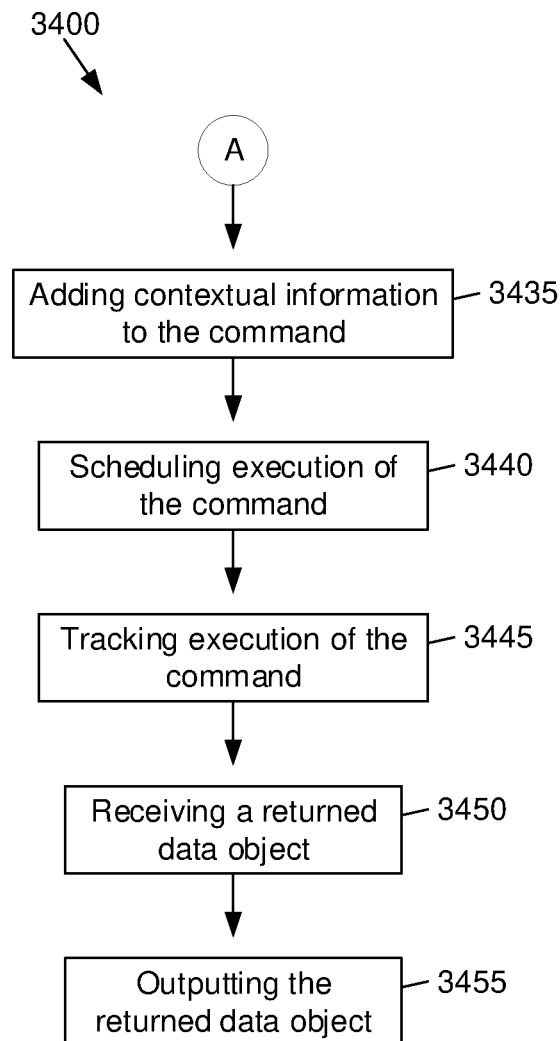

FIG. 34-35 illustrate a flow diagram of a method 3400 for managing a command in accordance with embodiments of the present technology. The method 3400 may be used for creating and/or managing a workflow. The workflow may include a set of nodes that are connected to each other. Events and/or other information may flow between the nodes in the workflow. The workflow may receive and/or process events.

At step 3405 an input event topic subscriber may be configured. The input event topic subscriber may be configured to retrieve and/or filter various events. The input event topic subscriber may be configured with one or more rules and/or filters to be used for filtering the events. The input event topic subscriber may forward any events that satisfy the one or more rules and/or filters to a next node in the workflow. The input event topic subscriber may be given an event type, event source, and/or any other information to be used to filter events. The input event topic subscriber may filter the events based on metadata associated with an event.

A user may configure the input event topic subscriber to filter out events based on data types. For example for a workflow based on the creation of an insurance submission may specify that the data types in an event that will start the workflow are: submission form, check file, and personal IDs. This configuration may be stored as metadata associated with the input event topic subscriber.

At step 3410 a command orchestrator may be configured. The command orchestrator may be configured to manage the execution of various commands. The command orchestrator may transmit commands to AI agents to be executed. The command orchestrator may manage the execution of the commands by the AI agents.

At step 3415 the input event topic subscriber may be invoked. The input event topic subscriber may be commanded to listen to a dedicated space where events are published. The input event topic subscriber may receive all events that are published and filter out events that fail to satisfy the input event topic subscriber's filters.

At step 3420 an event may be received. The input event topic subscriber may receive an event that satisfies the filters and then forward the event on to a next node in the workflow. The event may include event context and/or associated data. The event context may describe a source of the event, unique identifier of the event, time of the event, time to live of the event, type of the event, information about a workflow encompassing the event such as a workflow identifier and/or any other information describing the event.

At step 3425 the event may be transformed into a command. All or a portion of the received event may be included in the command. A header of the event may be modified to transform the event into the command.

At step 3430 the command may be input to the command orchestrator. The event may proceed from the input event topic subscriber node to the command orchestrator node.

At step 3435 contextual information may be added to the command. The command may be compared to previously executed commands and/or currently executing commands. If the command is equivalent and/or identical to a previously executed command and/or a currently executing command, contextual information may be added to the command. For example the contextual information may be a reference to the previously executed and/or currently executing command, data that was returned after the previously executed command was executed, and/or any other data corresponding to the previously executed and/or currently executing command. If the contextual data indicates that the command has previously been executed, the command might not be executed again. Rather than executing the command, the data that was returned when the identical command was previously executed may be used as the returned data for the present command.

Other types of contextual information may be added to the command as well. For example, a learning agent could add precision to the data in the command and/or add contextual information indicating that the event was transformed before entering the learning agent.

At step 3440 the command may be scheduled. The command orchestrator may schedule the command to be executed by one or more AI agents. The scheduling may be based on an authorization of the command, such as a target agent and/or an event type. The scheduling may be based on a time to live of the event, such as by scheduling the command to be completed prior to the command becoming dead. The scheduling may be based on a priority of the command. If the command has previously failed to execute, the command may be rescheduled with a higher priority. After failing to execute, the rescheduled command may be placed in a retry queue after a delay.

At step 3445 the execution of the command may be tracked. The amount of time that an AI agent is taking to execute the command may be monitored. If the AI agent exceeds a threshold amount of time to execute the command, the AI agent may be instructed to terminate execution of the command. After a failure, the command may be modified and/or re-executed.

In some instances, if the command fails to execute, a user interface may be output to a user. The user interface may include all or a portion of the command, and may ask the user to enter input corresponding to the command. For example if the command includes an image and a request to categorize the image, the user interface may display the image to a user and request that the user select the categories corresponding to the image.

At step 3450 a returned data object corresponding to the command may be received. An AI agent (or multiple agents) may process the command and output the returned data object. The returned data object may be a prediction made based on the command. For example if the AI agent is configured to perform optical character recognition, the command may include an image of text, or data describing the image of text, and the returned data object may include one or more predictions of the text in the image.

At step 3455 the returned data object may be output. The returned data object may be output to a user interface, to another node in the workflow, to another workflow, to another input event topic subscriber, to an output topic publisher, and/or to a dedicated space for event publication such as an event cloud.

Figure 36:
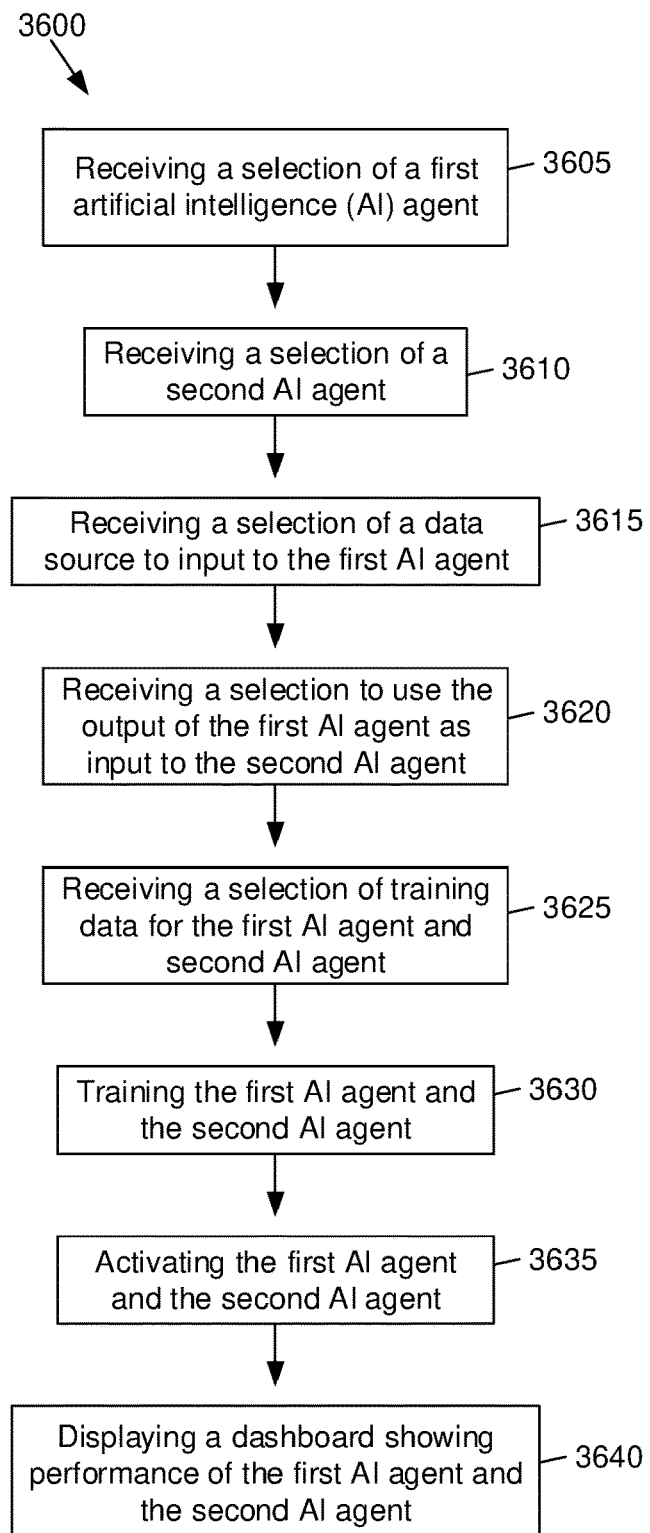
FIG. 36 illustrates a flow diagram of a method for managing AI agents in accordance with embodiments of the present technology.

FIG. 36 illustrates a flow diagram of a method 3600 for managing AI agents in accordance with embodiments of the present technology. A user may organize a workflow using a user interface. The user may add nodes to the workflow, such as user input nodes and/or AI agent nodes. The user may use the interface to control the flow of information between the nodes and/or the order of execution of the nodes. The user may manage the various nodes in the workflow using the interface. For example the user may train an AI agent, monitor the execution of an AI agent, attach interfaces or other enhancements to an AI agent, replace an AI agent, and/or configure parameters of the AI agent.

At step 3605 a selection of a first AI agent may be received. A user may select the first AI agent from a library of AI agents. The AI agent may include any type of ML algorithm, such as a neural network, clustering algorithm, etc. The user may modify various configurable parameters of the AI agent. A schema associated with the AI agent may indicate the parameters that are configurable. For example if the AI agent is a clustering agent, the user may select a maximum number of categories for the AI agent to create clusters for. If input data doesn't fit into one of those categories, the input data may be placed in an "other" category.

AI agents in the library of AI agents may be associated with a corresponding container. The container may include various information about the AI agent. The container may provide a unifying representation for all operations in a workflow. In other words, the container may provide a common interface for all nodes in a workflow. The container may allow various models and/or operations to be included in the workflow, regardless of what programming language the models and/or operations were written in. Each container may include a description of inputs and/or outputs for the respective model and/or operation associated with the container. By declaring the inputs and/or outputs of each node in the workflow, the workflow deployment may be type-checked before being put into use.

The containers may contain a description of one or more hook points for the associated model and/or operation. These hook points may allow an operation to be augmented, modified, and/or retargeted when deployed for a subset of supported languages and libraries. The container may provide an arrow-based representation for input and/or output of operations. For models, the container may provide a description of named model layers and/or pointers to layers inside the model. This may allow components to access portions of the model during execution of the model, such as by analyzing data at a logic layer of the model.

At step 3610 a selection of a second AI agent may be received. Actions performed at step 3610 may be similar to those described with regard to step 3605. Although the method 3600 describes a selection of a first and second AI agent, it should be understood that any number of AI agents may be selected and placed in any configuration. For example a third AI agent may be selected and configured to execute in parallel with the second AI agent. A user input node may be selected and placed in the workflow. The user input node may be activated if a prediction from an AI agent does not satisfy a threshold confidence.

At step 3615 a data source may be selected as input to the first AI agent. The data source may be an input event topic subscriber and/or any other data source. One or more nodes in the workflow may be selected as input to the first AI agent. The data type and/or format of the data source may be compared to a description of the first AI agent. If the data type and/or format of the data source fails to match the input type of the first AI agent, a warning may be displayed to the user. A suggestion of transforms and/or other steps that can be taken for inputting the selected input to the first AI agent may be output to the user.

At step 3620 the user may select an input for the second AI agent. The output of the first AI agent may be selected as input to the second AI agent. Any other suitable data sources may be selected as input to the second AI agent in addition to the output of the first AI agent.

At step 3625 training data may be selected for the first and/or second AI agents. The training data may be labelled training data that includes input for the first and/or second AI agent and a label corresponding to the input. Other data related to training the AI agents may be selected. For example, when training a "random forest" type model, the user may select the number of decision tree to use and/or the minimum number of sample leaves to use to fine tune the training.

At step 3630 the first and second AI agents may be trained using the selected training data. Inputs in the training data may be input to the first and/or second AI agent. The output of the first and/or second AI agent may be compared to the label corresponding to the input, such as by using a loss function to determine a difference between a prediction that is output by the first and/or second AI agent and the label. The first and/or second AI agent may be adjusted based on the difference between the prediction and the label.

At step 3635 the first AI agent and the second AI agent may be activated. When the first AI agent and the second AI agent are activated, they may receive input from the sources selected at steps 3615 and 3620. The first AI agent and/or second AI agent may output predictions made based on the input.

At step 3640 a dashboard may be displayed. The dashboard may indicate a performance of the first AI agent and the second AI agent. The dashboard may display various key performance indicators (KPI) that depend on the output of the AI agents. The display may indicate a rate at which the AI agents are processing input and/or any other information related to the AI agents.

In some instances the first AI agent (and/or the second AI agent) may be automatically updated and/or replaced. An updated version of the first AI agent may be received. The updated version of the first AI agent may be placed in the workflow and configured using the same configuration as the previous first AI agent. In order to continue the workflow without interrupting operations, the previous first AI agent may be killed and replaced with the updated first AI agent. The queue of commands for the previous first AI agent that had not been executed and/or had not finished executing may be given to the replacement first AI agent. In this manner, the workflow can continue with the updated first AI agent seamlessly and without interrupting operations.

While some of the above-described implementations may have been described and shown with reference to particular acts performed in a particular order, it will be understood that these acts may be combined, sub-divided, or re-ordered without departing from the teachings of the present technology. At least some of the acts may be executed in parallel or in series. Accordingly, the order and grouping of the act is not a limitation of the present technology.

It should be expressly understood that not all technical effects mentioned herein need be enjoyed in each and every embodiment of the present technology.

As used herein, the wording "and/or" is intended to represent an inclusive-or; for example, "X and/or Y" is intended to mean X or Y or both. As a further example, "X, Y, and/or Z" is intended to mean X or Y or Z or any combination thereof. As used herein, the wording "at least one of X or Y" or "at least one of X and Y" is intended to represent an inclusive-or; for example, "at least one of X or Y" or "at least one of X and Y" are intended to mean X or Y or both. As a further example, "at least one of X, Y or Z" or "at least one of X, Y and Z" are intended to mean X or Y or Z or any combination thereof.

The foregoing description is intended to be exemplary rather than limiting. Modifications and improvements to the above-described implementations of the present technology may be apparent to those skilled in the art.

What is claimed is:

1. A computer-implemented method for operating an event-driven architecture, the event-driven architecture comprising a first machine-learning (ML) agent operating a first service and a second ML agent operating a second service, the first ML agent comprising a first model and first model metadata, the second ML agent comprising a second model and second model metadata, the method comprising:
    generating, by the first ML agent, an event associated with event metadata, the event comprising results generated by the first model, the event metadata comprising an event identifier (ID);
    publishing, by the first ML agent, in a first virtualized dedicated space, the event;
    causing the second ML agent to monitor the first virtualized dedicated space;
    determining that the event is to be processed by the second ML agent;
    processing the event to generate an output, the processing comprising one of further training the second model based on the event or generating a prediction by the second model based on the event;
    generating, by the first ML agent, an additional event associated with additional event metadata, the additional event comprising intermediate results generated by the first model;
    determining that a level of confidence relating to the intermediate results is lower than a threshold value; and
    publishing, based on the level of confidence relating to the intermediate results being lower than the threshold value, the intermediate results in a second virtualized dedicated space.

2. The method of claim 1, further comprising:
    generating a response based on the output, the response comprising the event ID; and
    publishing the response, by the second ML agent, in the first virtualized dedicated space.

3. The method of claim 2, further comprising:
    determining that the response is to be consumed by the first ML agent based on the event ID;
    causing the first ML agent to monitor the first virtualized dedicated space; and
    processing the response.

4. The method of claim 2, wherein the second ML agent is further configured to execute at least one of caching the event for later usage, augmenting the event or pushing the event back to the first virtualized dedicated space.

5. The method of claim 1, wherein determining whether the event is to be processed by the second ML agent is based on a predefined workflow defining a sequence of actions between the first ML agent and the second ML agent.

6. The method of claim 1, the second ML agent is one of an inference agent configured to generate a prediction by the second model based on the event, a learning agent configured to execute further training the second model based on the event or an inference/learning agent configured to generate a prediction by the second model based on the event and execute further training the second model based on the event.

7. The method of claim 1, wherein the event is a plurality of events, the plurality of events comprising a first set of events associated with a first feed and a second set of events associated with a second feed and wherein the first ML agent monitors the first feed and the second ML agent monitors the second feed.

8. The method of claim 1, wherein the event is associated with a ML model and comprises at least a partial representation of the ML model and wherein the metadata is associated with the ML model.

9. The method of claim 8, wherein the event associated with the ML model and the metadata associated with the ML model is published in a third virtualized dedicated space (models cloud space).

10. The method of claim 1, wherein the first ML agent comprises one or more services mesh which encapsulates state and behavior.

11. The method of claim 1, wherein the first ML agent is configured to provide behavioral insights and operational control over a mesh.

12. The method of claim 1, wherein the first ML agent and the second ML agent enable one of a network of deployed services with load balancing, service-to-service authentication and monitoring.

13. The method of claim 1, wherein publishing the event in the first virtualized dedicated space comprises broadcasting a signal comprising the event.

14. The method of claim 13, further comprising enabling a formal representation of knowledge based on a system type information for the event broadcasted within the signal.

15. A system comprising:
at least one processor, and
memory storing a plurality of executable instructions which, when executed by the at least one processor, cause the system to:
generate, by a first machine-learning (ML) agent operating a first service, an event associated with event metadata, wherein the first ML agent comprises a first model and first model metadata, wherein the event comprises results generated by the first model, an wherein the event metadata comprises an event identifier (ID);
publish by the first ML agent, the event in a first virtualized dedicated space;
cause a second ML agent to monitor the first virtualized dedicated space;
determine that the event is to be processed by the second ML agent;
process the event to generate an output, the processing comprising one of further training the second model based on the event or generating a prediction by the second model based on the event,
generate, by the first ML agent, an additional event associated with additional event metadata, the additional event comprising intermediate results generated by the first model;
determine that a level of confidence relating to the intermediate results is lower than a threshold value; and
publish, based on the level of confidence relating to the intermediate results being lower than the threshold value, the intermediate results in a second virtualized dedicated space.

16. The system of claim 15, wherein the second ML agent is one of an inference agent configured to generate a prediction by the second model based on the event, a learning agent configured to execute further training the second model based on the event or an inference/learning agent configured to generate a prediction by the second model based on the event and execute further training the second model based on the event.

17. The system of claim 15, wherein the instructions further cause the system to:
generate a response based on the output, the response comprising the event ID; and
publish the response, by the second ML agent, in the first virtualized dedicated space.

* * * * *